(12) United States Patent
Kamada et al.

(10) Patent No.: US 8,994,852 B2
(45) Date of Patent: *Mar. 31, 2015

(54) IMAGE-CAPTURING APPARATUS AND IMAGE-CAPTURING METHOD

(75) Inventors: Yasunori Kamada, Kanagawa (JP); Takayasu Kon, Tokyo (JP); Yoichiro Sako, Tokyo (JP); Kazunori Hayashi, Tokyo (JP); Itaru Kawakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 667 days.

This patent is subject to a terminal disclaimer.

(21) Appl. No.: 13/272,895

(22) Filed: Oct. 13, 2011

(65) Prior Publication Data

US 2012/0026334 A1 Feb. 2, 2012

Related U.S. Application Data

(62) Division of application No. 12/229,059, filed on Aug. 19, 2008, now Pat. No. 8,063,952.

(30) Foreign Application Priority Data

Aug. 23, 2007 (JP) .................................. 2007-216669

(51) Int. Cl.
*H04N 5/262* (2006.01)
*H04N 5/77* (2006.01)
(Continued)

(52) U.S. Cl.
CPC ............... *H04N 5/77* (2013.01); *H04N 5/2251* (2013.01); *H04N 5/232* (2013.01)
USPC .................... 348/239; 348/207.99; 348/148

(58) Field of Classification Search
USPC ............. 348/118, 119, 148, 149, 207.99, 239
See application file for complete search history.

(56) References Cited

U.S. PATENT DOCUMENTS 5,708,863 A 1/1998 Satoh et al.
6,259,960 B1 7/2001 Inokuchi
(Continued)

FOREIGN PATENT DOCUMENTS

CN 1816111 A 8/2006
JP 06-030374 A 2/1994
(Continued)

OTHER PUBLICATIONS

Hewagamage et al., "Augmented Album: Situation-dependent System for a Personal Digital Video/Image Collection", 2000 IEEE Int'l Conference on Multimedia Computing & Systems, New York, Jul. 30, 2000 to Aug. 2, 2000, vol. 1, pp. 323-326.
(Continued)

*Primary Examiner* — Tuan Ho
(74) *Attorney, Agent, or Firm* — Wolf, Greenfield & Sacks, P.C.

(57) ABSTRACT

An image-capturing apparatus includes an image-capturing unit configured to capture image data of a subject and to store the captured image data in an image-capturing operation; a speed detector configured to detect speed information; and a controller configured to control the image-capturing unit so that, in an automatic image-capturing process that is not based on a shutter operation of a user, a distance moved by the image-capturing apparatus is computed on the basis of information from the speed detector, and the image-capturing operation is performed in response to the fact that a computation result indicating that the image-capturing apparatus has moved a predetermined distance is obtained.

12 Claims, 14 Drawing Sheets

(51) Int. Cl.
*H04N 5/225* (2006.01)
*H04N 5/232* (2006.01)

(56) References Cited

U.S. PATENT DOCUMENTS

| | | |
|---|---|---|
| 6,459,388 B1 | 10/2002 | Baron |
| 6,893,132 B2 | 5/2005 | Mori et al. |
| 7,171,285 B2 | 1/2007 | Kim et al. |
| 7,472,134 B2 | 12/2008 | Kaku |
| 7,512,494 B2 | 3/2009 | Nishiuchi |
| 7,532,975 B2 * | 5/2009 | Ishikawa ............... 701/409 |
| 7,616,883 B2 | 11/2009 | Nakajima et al. |
| 7,742,083 B2 | 6/2010 | Fredlund et al. |
| 7,924,323 B2 | 4/2011 | Walker et al. |
| 7,995,109 B2 | 8/2011 | Kamada et al. |
| 8,063,952 B2 | 11/2011 | Kamada et al. |
| 8,243,156 B2 | 8/2012 | Sako |
| 8,488,012 B2 | 7/2013 | Kamada et al. |
| 2002/0039203 A1 | 4/2002 | Endo et al. |
| 2003/0151672 A1 | 8/2003 | Robins et al. |
| 2004/0061781 A1 | 4/2004 | Fennell et al. |
| 2004/0174434 A1 | 9/2004 | Walker et al. |
| 2004/0239776 A1 | 12/2004 | Shinohara et al. |
| 2005/0122405 A1 | 6/2005 | Voss et al. |
| 2005/0222753 A1 | 10/2005 | Ishikawa |
| 2006/0050982 A1 | 3/2006 | Grosvenor |
| 2006/0171694 A1 | 8/2006 | Kamimura et al. |
| 2006/0197845 A1 | 9/2006 | Masaki |
| 2007/0147814 A1 | 6/2007 | Nomura et al. |
| 2007/0206093 A1 | 9/2007 | Kuwabara et al. |
| 2007/0253696 A1 | 11/2007 | Nakajima et al. |
| 2007/0285533 A1 | 12/2007 | Furuya et al. |
| 2007/0291987 A1 | 12/2007 | Saka et al. |
| 2008/0192129 A1 | 8/2008 | Walker et al. |
| 2008/0316339 A1 | 12/2008 | Sugino et al. |
| 2009/0027513 A1 | 1/2009 | Sako |
| 2009/0051785 A1 | 2/2009 | Kamada et al. |
| 2009/0051788 A1 | 2/2009 | Kamada et al. |
| 2009/0115865 A1 | 5/2009 | Kamada et al. |
| 2009/0278766 A1 | 11/2009 | Sako et al. |
| 2013/0229562 A1 | 9/2013 | Kamada et al. |

FOREIGN PATENT DOCUMENTS

| | | |
|---|---|---|
| JP | 07-107351 A | 4/1995 |
| JP | 08-279954 A | 10/1996 |
| JP | 10-150598 A | 6/1998 |
| JP | 10-282536 | 10/1998 |
| JP | 2002-022463 A | 1/2002 |
| JP | 2002-034030 A | 1/2002 |
| JP | 2003-060972 A | 2/2003 |
| JP | 2004-212232 A | 7/2004 |
| JP | 2004-333921 A | 11/2004 |
| JP | 2005-276220 A | 10/2005 |
| JP | 2005-303492 A | 10/2005 |
| JP | 2005-348178 A | 12/2005 |
| JP | 2006-140695 A | 6/2006 |
| JP | 2006-251938 A | 9/2006 |
| JP | 2006-270561 A | 10/2006 |
| JP | 2007-057814 A | 3/2007 |
| JP | 2007-066251 A | 3/2007 |
| JP | 2007-109049 A | 4/2007 |
| JP | 2007-123953 A | 5/2007 |
| JP | 2007-150993 A | 6/2007 |
| JP | 2007-172035 A | 7/2007 |
| JP | 2007-206099 A | 8/2007 |
| WO | WO 90/08371 A1 | 7/1990 |

OTHER PUBLICATIONS

Yang et al., "Smart Sight: A Tourist Assistant System", Proc 3rd Int'l Syposium on Wearable Computers, 1999, pp. 73-78 (retreived on Oct. 30, 2008 from http://isl.ira.uka.de/fileadmin/publicationfiles/ISWC99-jie.pdf.

* cited by examiner

IMAGE-CAPTURING APPARATUS AND IMAGE-CAPTURING METHOD

CROSS REFERENCES TO RELATED APPLICATIONS

The present invention is a Divisional application of U.S. application Ser. No. 12/229,059, filed Aug. 19, 2008, which claims the priority benefit of Japanese patent application number 2007-216669, filed in the Japanese Patent Office on Aug. 23, 2007, which is hereby incorporated by reference to the maximum extent allowable by law.

BACKGROUND OF THE INVENTION

1. Field of the Invention

The present invention relates to an image-capturing apparatus and an image-capturing control method. More particularly, the present invention relates to an image-capturing apparatus for performing drive log image capturing and life log image capturing as automatic image capturing.

2. Description of the Related Art

For example, as a drive log camera, a camera which is disposed inside an automobile has been considered, in which still images are captured periodically, and thereby a user records scenery in the traveling direction and inside the car as image data while driving the car. Furthermore, in addition to image capturing of still images, a camera for capturing moving images has also been considered. Furthermore, a camera of a type, which is also called a life log camera or a life slice camera, which is worn by a user himself/herself, and in which image capturing is periodically performed to capture an activity history of the user, has also been considered.

By using the drive log camera and the life log camera, it is possible to record, as image data, the activity history and memories of the user when the user moves by an automobile, on foot, or the like.

In Japanese Unexamined Patent Application Publication No. 2007-109049, an apparatus is proposed in which images of the surroundings of a user's vehicle are captured using a camera disposed in the user's vehicle, an edge extraction process is performed on camera images when the user's vehicle is stopped and on camera images when the user's vehicle starts moving in order to detect an object. When an object is detected, the camera image at the departure time is displayed on a display device, and when an object is not detected, the camera image at the departure time is not displayed.

SUMMARY OF THE INVENTION

When, as a drive log camera and a life log camera, an apparatus is considered in which an image-capturing apparatus is disposed in an automobile, a small image-capturing apparatus, which is mounted in an eyeglass-type or headgear-type wearing unit, is worn by a user, image capturing is performed at fixed time intervals, captured image data is stored, and distance intervals as places where image capturing has been performed become uncertain depending on the movement speed of the automobile and the user.

FIG. 15 shows the relationship between an image-capturing distance interval and the speed of the image-capturing apparatus when, for example, image capturing is performed at fixed time intervals in an image-capturing apparatus disposed in an automobile. The image-capturing apparatus is disposed in the automobile, and therefore, the speed of the image-capturing apparatus, referred to herein, is the traveling speed of the automobile.

As shown in FIG. 15, if the speed is low, the distance moved during the period of a fixed time interval as an image-capturing time is small and therefore, the image-capturing distance interval becomes small. If the speed is high, the moved distance during a fixed time interval is large and therefore, the image-capturing distance interval becomes large.

FIG. 16A shows changes in the speed of the image-capturing apparatus. In FIG. 16A, the horizontal axis indicates the speed and the horizontal axis indicates the time.

FIG. 16A shows the speed of the image-capturing apparatus in response to, for example, changes in the speed of the automobile. In this case, first, the automobile transits at a low speed, the speed gradually increases, and after a while, the automobile transits at a high speed.

Then, at this time, the image-capturing apparatus automatically captures images of a subject at time intervals as time periods T and stores the captured image data.

In FIG. 16A, times at which captured image data to be stored has been captured are indicated as points in time P1 to P9. The time period T should preferably be determined as a certain time period of between, for example, approximately 5 to 60 seconds.

FIG. 16B shows distance intervals between places at which image capturing is performed when image capturing is performed at the intervals of the time period T as shown in FIG. 16A. Here, the image-capturing distance intervals between image-capturing places at points in time P1 to P9 at which capturing of image data was performed are denoted as distances L1 to L5.

As shown in FIG. 16A, the speed was constant in the period between points in time P1 to P4 at which images of a subject were captured. Therefore, all the image-capturing distance intervals for image-capturing places between points in time P1 and P2, between points in time P2 and P3, and between points in time P3 and P4 are set to a distance L1, as shown in FIG. 16B. At points in time P1 to P4, image capturing is performed at places which are the same distance interval.

However, as shown in FIG. 16A, as the speed gradually increases between points in time P4 to P7, the distance intervals between image-capturing places gradually increase as shown by a distance L2, a distance L3, and a distance L4 in FIG. 16B.

The image-capturing apparatus moves at the highest speed between points in time P7 to P9. For this reason, the distance intervals between the image-capturing places at points in time P7, P8, and P9 are long distance intervals like a distance L5.

As described above, when image capturing is performed at fixed time intervals in the image-capturing apparatus, distance intervals as places at which capturing of image data to be stored is to be performed are not fixed due to changes in the speed of the image-capturing apparatus, and image capturing is performed at distance intervals corresponding to the speed of the image-capturing apparatus.

Here, when image capturing is performed to record a drive log or a life log, as one way of accurately storing a driving history and an activity history as images, performing of image capturing at places separated by fixed distance intervals that are as constant as possible has been demanded.

Accordingly, it is desirable to perform image capturing at places at approximately fixed distance intervals when image data to be stored is automatically captured in the image-capturing apparatus.

According to an embodiment of the present invention, there is provided an image-capturing apparatus including:

image-capturing means for capturing image data of a subject and for storing the captured image data in an image-capturing operation; speed detection means for detecting speed information; and control means for controlling the image-capturing means so that, in an automatic image-capturing process that is not based on a shutter operation of a user, a distance moved by the image-capturing apparatus is computed on the basis of the speed information from the speed detection means, and the image-capturing operation is performed in response to the fact that a computation result indicating that the image-capturing apparatus has moved a predetermined distance is obtained.

The control means may set a shortest waiting time period as a time period from the time when the image-capturing operation is performed in the image-capturing means, and if the shortest waiting time period has not passed when the computation result indicating that the image-capturing apparatus has moved the predetermined distance is obtained on the basis of the speed detection information from the speed detection means, the control means may cause the image-capturing means to perform an image-capturing operation after the shortest waiting time period has elapsed.

The control means may set a longest waiting time period as a time period from the time when the image-capturing operation is performed in the image-capturing means, and when the longest waiting time period has passed before the computation result indicating that the image-capturing apparatus has moved the predetermined distance is obtained on the basis of the speed detection information from the speed detection means, the control means may cause the image-capturing means to perform an image-capturing operation in response to the passage of the longest waiting time period.

The control means may set a shortest waiting time period and a longest waiting time period as time periods from the time when the image-capturing operation is performed in the image-capturing means, if the shortest waiting time period has not passed when the computation result indicating that the image-capturing apparatus has moved the predetermined distance is obtained on the basis of the speed detection information from the speed detection means, the control means may cause the image-capturing means to perform an image-capturing operation after the shortest waiting time period has elapsed, and when the longest waiting time period has passed before the computation result indicating that the image-capturing apparatus has moved the predetermined distance is obtained on the basis of the speed detection information from the speed detection means, the control means may cause the image-capturing means to perform an image-capturing operation in response to the passage of the longest waiting time period.

When the computation result indicating that the image-capturing apparatus has moved the predetermined distance is obtained on the basis of the speed detection information from the speed detection means, the control means may instruct a change of an image size in the image-capturing operation of the image-capturing means on the basis of the time period elapsed after the image-capturing operation is performed in the image-capturing means.

When the computation result indicating that the image-capturing apparatus has moved the predetermined distance is obtained on the basis of the speed detection information from the speed detection means, the control means may instruct a change of a compression ratio in the image-capturing operation of the image-capturing means on the basis of the time period elapsed after the image-capturing operation is performed in the image-capturing means.

When a computation result indicating that the image-capturing apparatus has moved the predetermined distance is obtained on the basis of the speed detection information from the speed detection means, the control means may instruct a switching between a still-image capturing operation and a moving-image capturing operation as the image-capturing operation of the image-capturing means on the basis of the time period elapsed after the image-capturing operation is performed in the image-capturing means.

According to another embodiment of the present invention, there is provided an image-capturing method for use with an image-capturing apparatus for performing an automatic image-capturing process that is not based on a shutter operation of a user, the image-capturing method including: detecting speed information; computing a distance moved by the image-capturing apparatus on the basis of the speed information in the speed detection; and capturing image data of a subject and storing the captured image data in an image-capturing operation in response to the fact that a computation result indicating that the image-capturing apparatus has moved a predetermined distance is obtained.

According to the embodiments of the present invention, the distance moved by the image-capturing apparatus is computed, and an image-capturing operation is performed in response to the image-capturing apparatus being moved a predetermined distance. The scenery at places separated by approximately fixed distance intervals are stored by automatic image capturing. The movement distance may be determined by computation of the detected speed of the image-capturing apparatus and the movement time period.

Furthermore, if the movement speed is too high, times at which a fixed distance interval is reached frequently occur. When the automobile is stopped, a time at which a fixed distance interval will be reached will not occur for a long time. Therefore, basically, image capturing is performed at times that correspond to fixed distance intervals and also, a shortest waiting time period and a longest waiting time are set, so that the above cases can be appropriately dealt with.

According to the embodiments of the present invention, in a case in which automatic image capturing for, for example, a drive log and a life log is performed using an image-capturing apparatus installed in a vehicle or worn by a user, an image-capturing operation is performed in response to the detection that the image-capturing apparatus has moved a predetermined distance. As a consequence, it is possible to perform image capturing for places at approximately fixed distance intervals regardless of the movement speed of the vehicle and the user. As a result, it is possible to store images appropriate for the vehicle and an activity history of the user.

Furthermore, if a shortest waiting time period and a longest waiting time period are set and image-capturing times are set, it is possible to perform an appropriate image capturing in such a manner as to cope with a case in which the movement speed is too high or too low.

Furthermore, the time interval from the time of the previous image capturing until the time of the next image capturing varies in response to a movement speed. If the size of an image to be captured and the compression ratio thereof are changed in response to the situation and switching between still-image capturing and moving-image capturing is performed, it is possible to store captured image data appropriate for a moving situation.

DESCRIPTION OF THE PREFERRED EMBODIMENTS

Embodiments of the present invention will be described below. The description will be given in the following order.
1. Exterior of Image-Capturing Apparatus
2. Example of Configuration of Image-Capturing Apparatus
3. Automatic Image-Capturing Processing Operation Example I
4. Automatic Image-Capturing Processing Operation Example II
5. Automatic Image-Capturing Processing Operation Example III
6. Automatic Image-Capturing Processing Operation Example IV
7. Automatic Image-Capturing Processing Operation Example V
8. Automatic Image-Capturing Processing Operation Example VI
9. Automatic Image-Capturing Processing Operation Example VII
10. Modification 1. Exterior of Image-Capturing Apparatus As an image-capturing apparatus 1 according to an embodiment of the present invention, various kinds of forms are conceived. Examples of the exterior thereof are shown in FIGS. 1A, 1B, and 1C.

Figure 1A:
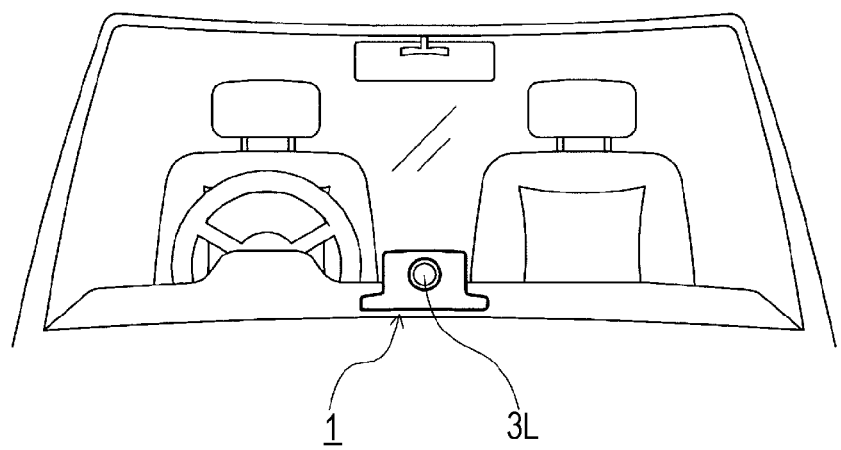
FIGS. 1A, 1B, and 1C are illustrations of examples of the exterior of an image-capturing apparatus according to an embodiment of the present invention.
Figure 1B:
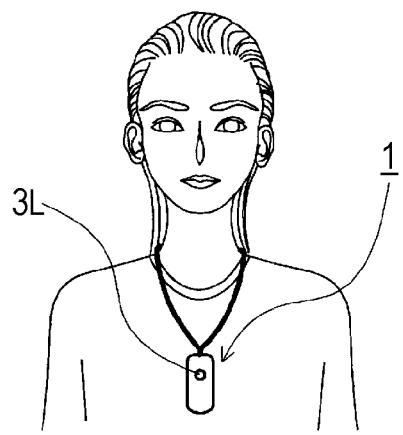
Figure 1C:
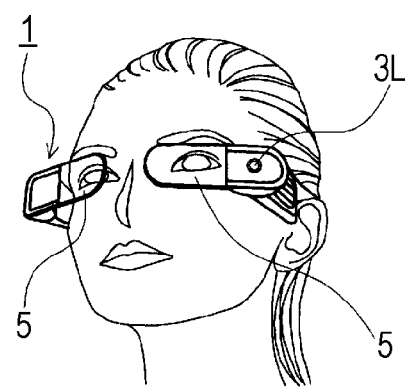

FIG. 1A shows the image-capturing apparatus 1 of a type to be installed into an automobile. The image-capturing apparatus 1 has a fixation mechanism for mounting on, for example, a dashboard, and is disposed on the dashboard by means of a screw, a bolt, a bonding tape, or the like, as shown in the figure. At this time, an image-capturing lens 3L provided in the image-capturing apparatus 1 should preferably be disposed so as to be capable of capturing an image by assuming the traveling direction (toward the front) of the automobile to be a subject direction.

Although not shown in the figure, a display unit used to monitor or reproduce captured images may be provided in, for example, the back part of the image-capturing apparatus 1.

The image-capturing lens 3L may be disposed in such a manner that the direction of the image-capturing lens 3L is directed toward the inside of the automobile so that image capturing is performed by assuming, rather than the traveling direction of the automobile, the inside of the automobile as a subject direction.

FIG. 1B shows the image-capturing apparatus 1 of a neck hanging type. The image-capturing apparatus 1 has a part with which, for example, a strap is fixed, and is mounted in such a manner that the strap is fixed in that part and is hung around the user's neck. A user should preferably wear it so that the image-capturing lens 3L provided in the image-capturing apparatus 1 can perform image capturing by assuming toward the front of the user to be a subject direction.

Similarly to FIG. 1A, although not shown in FIG. 1B, a display unit used to monitor and reproduce captured images may be provided in the back part of the image-capturing apparatus 1.

FIG. 1C shows the image-capturing apparatus 1 that is formed as an eyeglass-type display camera. The image-capturing apparatus 1 has, for example, a mounting unit of a frame structure that half-circles from both-side head part toward the back head part, and is attached to the user as a result of being hung around both auricles, as shown in the figure.

In this image-capturing apparatus 1, in a state in which the user has worn the image-capturing apparatus 1, the image-capturing lens 3L is arranged toward the front in such a manner that image capturing is performed by assuming the field-of-view direction of the user to be a subject direction.

Furthermore, in the worn state shown in the figure, a pair of display units 5 and 5 for the left eye and the right eye are arranged immediately before both eyes of the user, that is, at a place where the lenses in normal eyeglasses are positioned. For the display units 5, for example, a liquid-crystal panel is used, and by controlling transmittance, a through state shown in the figure, that is, a transparent or semi-transparent state can be formed. As a result of the display units 5 being made to be a through state, even if the user wears the image-capturing apparatus 1 like eyeglasses at all times, no problem is posed in ordinary life.

A pair of display units 5 are provided so as to correspond to both eyes and also, one display unit 5 may be provided so as to correspond to one eye. In addition, the display units 5 may not be provided.

Up to this point, in FIGS. 1B and 1C, the neck-hanging type or eyeglass-type image-capturing apparatus 1 has been shown. Another configuration for the user to wear the image-capturing apparatus 1 is also possible. Any type of mounting unit, such as, for example, a headphone-type, neck-band-type, or behind-the-ear type, may be worn by the user. In addition, a form may also be possible in which the image-capturing apparatus 1 is worn by the user in such a manner that the image-capturing apparatus 1 is mounted in ordinary eyeglasses or visor, a headphone, or the like by using fixture such as a clip. Furthermore, the image-capturing apparatus 1 may not necessarily be mounted in the head part of the user.

In the case of FIG. 1B, the image-capturing direction is set as being toward the front of the user. Alternatively, the image-capturing apparatus 1 may also be worn in such a manner as to be hung around the neck so that image capturing is performed for the area behind the user when it is worn.

Then, in the case of FIG. 1C, the image-capturing direction is set as a field-of-view direction. In addition, a configuration in which the image-capturing lens 3L is mounted so that image capturing of an area behind the user, an area at a side of the user, an area above the user, an area in a downward direction toward the feet, and the like when the image-capturing apparatus 1 is worn, and a configuration in which a plurality of image-capturing systems whose image-capturing directions are the same or different are provided.

Furthermore, in FIGS. 1A, 1B, and 1C, an image-capturing direction varying mechanism with which the subject direction can be varied manually or automatically may be provided for one or a plurality of image-capturing lenses 3L.

As an image-capturing apparatus for capturing an image, of course, forms other than those shown in FIGS. 1A, 1B, and 1C are possible. For example, a device, an example of which is a mobile phone, a PDA (Personal Digital Assistant), or a portable personal computer, and which is provided with a function of an image-capturing apparatus, can be conceived as the image-capturing apparatus 1 of this embodiment.

Furthermore, in the above various forms, for example, a microphone for collecting outside sound may be provided, so that an audio signal that is recorded together with image data can be obtained. Furthermore, a speaker unit for performing audio output and an earphone unit may also be formed.

Furthermore, a light-emitting unit for performing illumination in the subject direction in the form of, for example, an LED (Light Emitting Diode), may be provided in the vicinity of the image-capturing lens 3L, or a flash light-emitting unit for capturing an image may be provided.

2. Example of Configuration of Image-Capturing Apparatus

At this point, an example of the configuration of the image-capturing apparatus 1 according to the embodiment of the present invention will be described.

Figure 2:
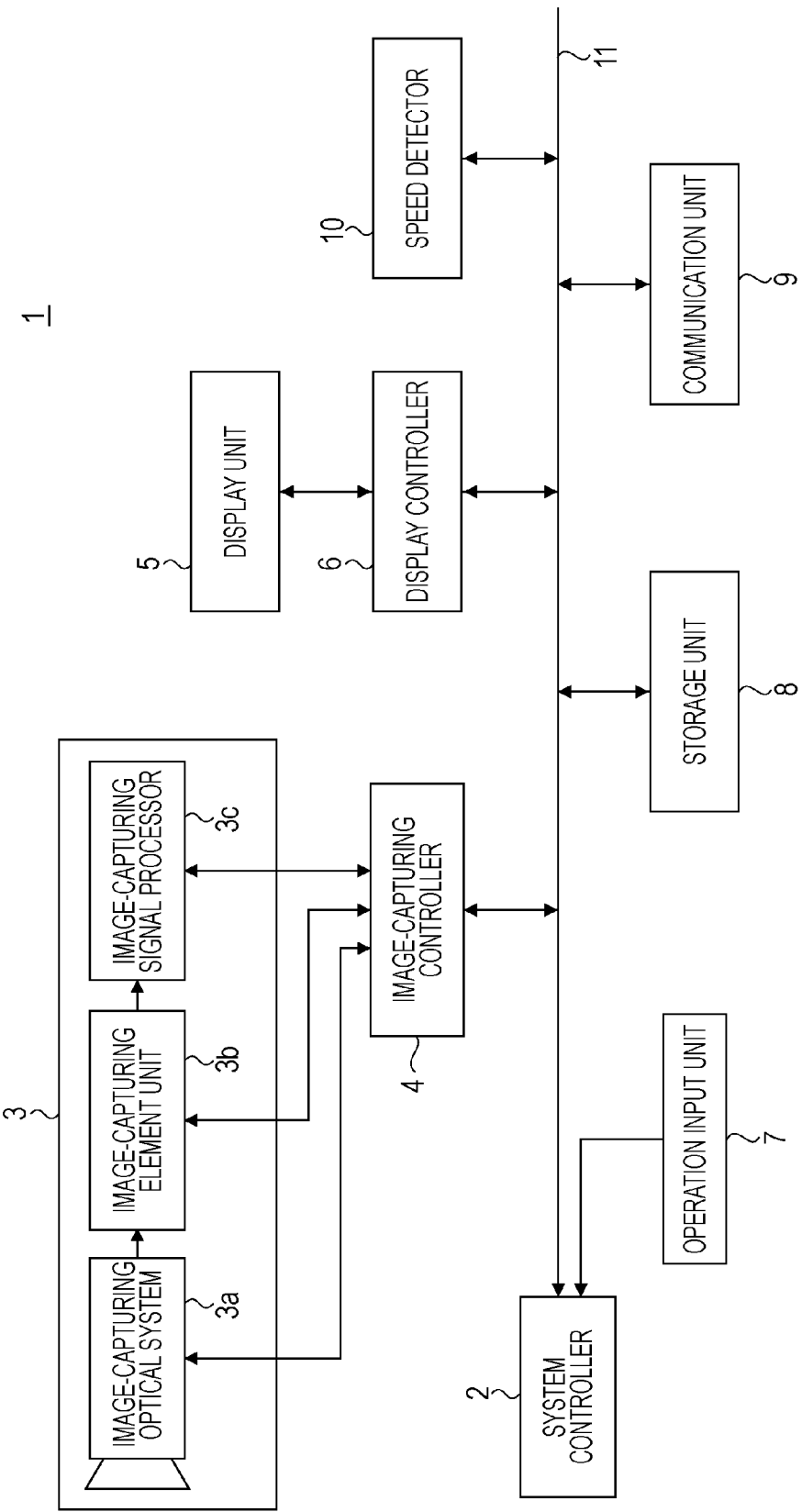
FIG. 2 is a block diagram of the image-capturing apparatus according to the embodiment of the present invention.

FIG. 2 is a block diagram showing the internal configuration of the image-capturing apparatus 1.

As shown in the figure, the image-capturing apparatus 1 includes a system controller 2, an image-capturing unit 3, an image-capturing controller 4, a display unit 5, a display controller 6, an operation input unit 7, a storage unit 8, a communication unit 9, a speed detector 10, and a bus 11.

The system controller 2 is formed by a microcomputer including, for example, a CPU (Central Processing Unit), a ROM (Read Only Memory), a RAM (Random Access Memory), a non-volatile memory unit, and an interface unit, and serves as a controller for controlling the entire image-capturing apparatus 1. The system controller 2 performs various kinds of computation processes and transmission and reception of a control signal with each unit via the bus 11 in accordance with a program stored in the internal ROM or the like, and causes each unit to perform a necessary operation.

The image-capturing unit 3 includes an image-capturing optical system 3a, an image-capturing element unit 3b, and an image-capturing signal processor 3c.

The image-capturing optical system 3a in the image-capturing unit 3 is provided with a lens system including the image-capturing lens 3L shown in FIG. 1, an aperture, a zoom lens, a focus lens, and the like; and a driving system for causing the lens system to perform a focus operation and a zoom operation.

In the image-capturing element unit 3b in the image-capturing unit 3, a solid-state image-capturing element array for detecting image-capturing light obtained by the image-capturing optical system 3a and for generating an image-capturing signal by performing photoelectric conversion thereon is provided. The solid-state image-capturing element array is formed as, for example, a CCD (Charge Coupled Device) sensor array or a CMOS (Complementary Metal Oxide Semiconductor) sensor array.

The image-capturing signal processor 3c in the image-capturing unit 3 includes a sample-hold/AGC (Automatic Gain Control) circuit for performing gain adjustment and waveform shaping on a signal obtained by solid-state image-capturing elements, and a video A/D converter, and obtains captured image data as digital data. Furthermore, a white-balance process, a luminance process, a color signal process, and the like are performed on the captured image data.

Image capturing is performed by the image-capturing unit 3 having the image-capturing optical system 3a, the image-capturing element unit 3b, and the image-capturing signal processor 3c, and captured image data is obtained.

The image data obtained by the image-capturing operation of the image-capturing unit 3 is processed by the image-capturing controller 4.

Under the control of the system controller 2, the image-capturing controller 4 performs a process for converting the captured image data into a predetermined image data format and a process for supplying the converted captured image data to the image analysis unit 12, the storage unit 9, and the display controller 6 in response to the operation status.

On the basis of the instruction of the system controller 2, the image-capturing controller 4 performs on/off control of an image-capturing operation in the image-capturing unit 3, driving control of a zoom lens and a focus lens of the image-capturing optical system 3a, control of the sensitivity of the image-capturing element unit 3b and the frame rate, parameter control of each process of the image-capturing signal processor 3c, and setting of execution processes.

For the configuration for performing display to a user in the image-capturing apparatus 1, a display unit 5 and a display controller 6 are provided.

The display unit 5 is provided with a display driving unit for driving a liquid-crystal display or the like. This display driving unit is formed of a pixel driving circuit for displaying image data supplied from the image-capturing controller 4 on, for example, a liquid-crystal display. The pixel driving circuit applies, at a predetermined horizontal/vertical driving timing, a driving signal based on a video signal to each of pixels arranged in a matrix in the liquid-crystal display, so that display is performed.

Under the control of the system controller 2, the display controller 6 drives a pixel driving circuit in the display unit 5 so as to perform predetermined display. That is, display as an image-capturing monitor in the image-capturing unit 3 is performed.

In order to perform these displays, for example, luminance level adjustment, color correction, contrast adjustment, sharpness (contour enhancement) adjustment, and the like can be performed. Furthermore, generation of an expanded image such that part of image data is expanded or generation of a reduced image, image effect processes, such as soft focus, mosaic, luminance inversion highlight display (enhancement display) of part of an image, changing of atmosphere of the color of the whole, and the like can be performed.

The operation input unit 7 has operation elements such as, for example, keys, buttons, and dials. For example, operation elements used in power-supply on/off operation and used in an on/off operation of an automatic image-capturing processing function (to be described later) are formed. Furthermore, operation elements used in the operation of the image-capturing system, for example, shutter operation, zoom operation, exposure setting operation, self-timer image-capturing operation, and the like may be formed.

The operation input unit 7 supplies information obtained from such operation elements to the system controller 2, and the system controller 2 performs necessary computation processes and control corresponding to these items of information.

The storage unit 8 is used to store various kinds of data. For example, the storage unit 8 is used to store captured image data.

This storage unit 8 may be formed of a solid-state memory such as a flash memory, and may also be formed of, for example, an HDD (Hard Disk Drive).

The storage unit 8, rather than being formed as an incorporated recording medium, may also be formed as a recording and reproduction drive compatible with a portable recording medium, for example, a memory card, an optical disc, a magneto-optical disc, a hologram memory, or the like, in which a solid-state memory is contained.

Of course, both a built-in type memory, such as a solid-state memory or an HDD, and a recording and reproduction drive for a portable recording medium may be installed.

Under the control of the system controller 2, the storage unit 8 records and stores the captured image data.

Under the control of the system controller 2, the recorded data is read, and the data is supplied to the system controller 2, the display controller 6, and the like.

The communication unit 9 is provided as a unit for performing data communication with various kinds of external devices.

For example, transmission and reception of data may be performed with a server apparatus (not shown). In that case, for example, network communication may be performed via a short-distance wireless communication with respect to a network access point by using a method, such as, for example, a wireless LAN or Bluetooth or, for example, wireless communication may be performed directly with a server apparatus having a compliant communication function.

Furthermore, the communication unit 9 may be connected to a device, such as a personal computer, by using an interface, such as, for example, a USB (Universal Serial Bus) method, so that transmission and reception of data is performed.

The communication unit 9 enables, for example, captured image data that is captured and stored in the storage unit 8 to be transferred to a personal computer or other external devices.

The speed detector 10 detects the movement speed of the image-capturing apparatus 1 and sends the detected speed information to the system controller 2. In the case of the in-vehicle image-capturing apparatus 1 shown in FIG. 1A, the movement speed of the image-capturing apparatus 1 is the traveling speed of the automobile. Furthermore, in the case of the image-capturing apparatus 1 being of a type that the user wears as in FIGS. 1B and 1C, the movement speed of the image-capturing apparatus 1 is the movement speed of the user.

The movement speed of the user is a movement speed that may be not only the speed of walking and running, but also the speed when the user rides a bicycle, an automobile, an electric train, or the like.

For example, when the image-capturing apparatus 1 is disposed in a vehicle, such as an automobile, the speed detector 10 can be configured to detect vehicle-speed pulses of the vehicle.

The speed detector 10 is not limited to an in-vehicle type or a user wearing type, and can be constituted by, for example, a GPS (Global Positioning System) receiver, a WiFi (Wireless Fidelity) device, a position detector using position information service provided by a mobile phone company, and a computation circuit.

For example, by performing position detection at unit time intervals and by computing a movement distance as a difference of the position, it is possible to compute the speed on the basis of the movement distance and the unit time period.

The configuration of the image-capturing apparatus 1 has been described above, but this is only an example. Addition and deletion of various components are of course considered on the basis of examples of operations and functions, which are performed in practice.

3. Automatic Image-Capturing Processing Operation Example I

The image-capturing apparatus 1 of this example, which is shown as an example in FIGS. 1A, 1B, and 1C, is configured in the manner described above. In particular, the system controller 2 performs control so that image capturing is performed automatically (without depending on a shutter operation by the user) and thereby, an operation of capturing an image as a drive log or a life log is performed. The image-capturing operation refers to an operation of storing captured image data captured by the image-capturing unit 3 in the storage unit 8.

Then, when this automatic image-capturing process function is used, an automatic image-capturing processing operation is performed so that an image-capturing operation is performed at approximately fixed distance intervals irrespective of the movement speed of the automobile and the user.

An automatic image-capturing processing operation of this embodiment will be described below. As the image-capturing apparatus 1 in automatic image-capturing processing operation example I to be described herein and automatic image-capturing processing operation examples II, III, IV, V, VI, and VII (to be described later), a type of image-capturing apparatus 1 disposed in an automobile, shown in FIG. 1A, is assumed and described.

Figure 3A:
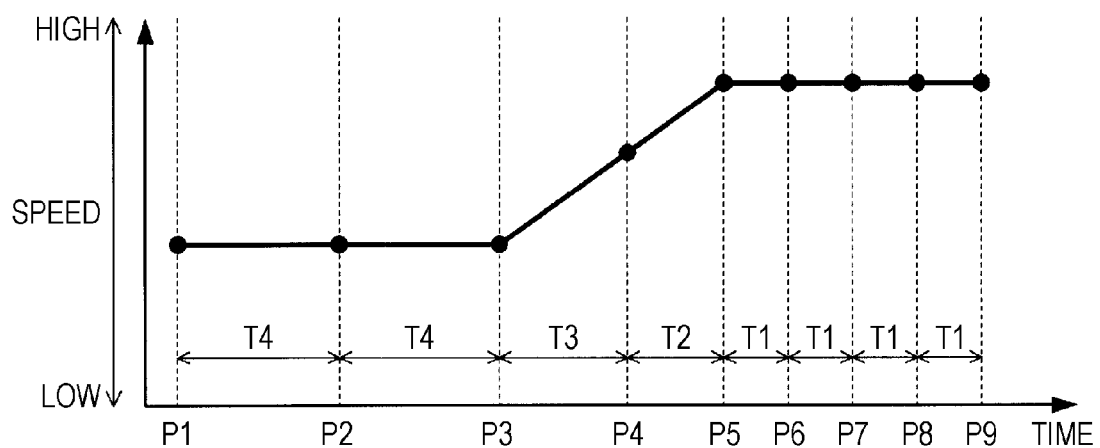
FIGS. 3A and 3B are illustrations of an automatic image-capturing processing operation example I according to the embodiment of the present invention.

FIG. 3A shows changes in the speed of the image-capturing apparatus 1, in which the horizontal axis indicates the speed and the horizontal axis indicates the time.

Since the image-capturing apparatus 1 is disposed in an automobile, the speed referred to herein indicates that the speed at which the automobile travels is shown as the speed of the image-capturing apparatus 1. This also applies to the automatic image-capturing processing operation examples II, III, IV, V, VI, and VII (to be described later).

The traveling speed of the automobile constantly changes. FIG. 3A shows changes in the speed of the automobile, that is, changes in the speed of the installed image-capturing apparatus 1. In this case, first, the automobile transits at a low speed, the speed gradually increases, and after a while, the automobile transits at a high speed.

In FIG. 3A, times at which an image-capturing operation is performed at fixed distance intervals in response to the speed of the image-capturing apparatus 1 are shown as points in time P1 to P9.

Figure 3B:
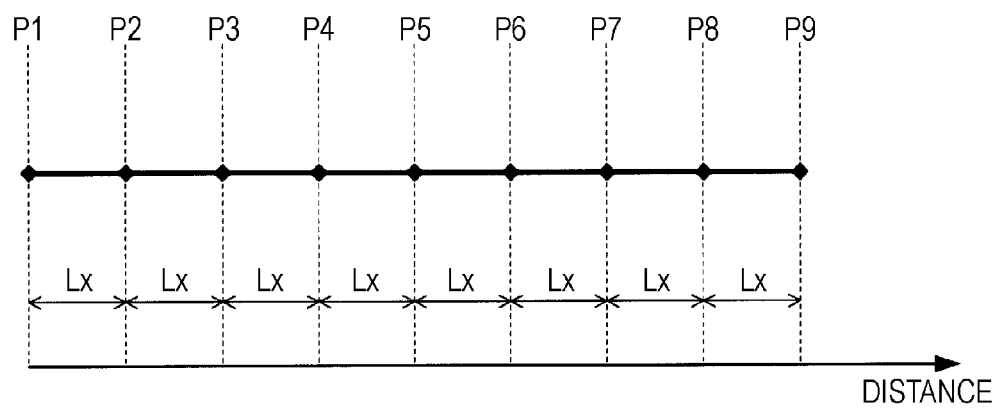

FIG. 3B also shows variations in the geographical distance at points in time P1 to P9 shown in FIG. 3A. Since the automobile (the image-capturing apparatus 1) is moving, at points in time P1 to P9, image capturing is performed at different image-capturing places. In this case, the distance interval at each place at each of points in time P1 to P9 is a distance Lx.

That is, if image-capturing operation times are assumed to be points in time P1 to P9 in FIG. 3A in response to the movement speed and its change in the speed, it is possible for the image-capturing apparatus 1 to perform image capturing at places at intervals of approximately fixed distance intervals when viewed geographically.

The processing of the system controller 2 for implementing such an operation will be described with reference to FIG. 4.

Figure 4:
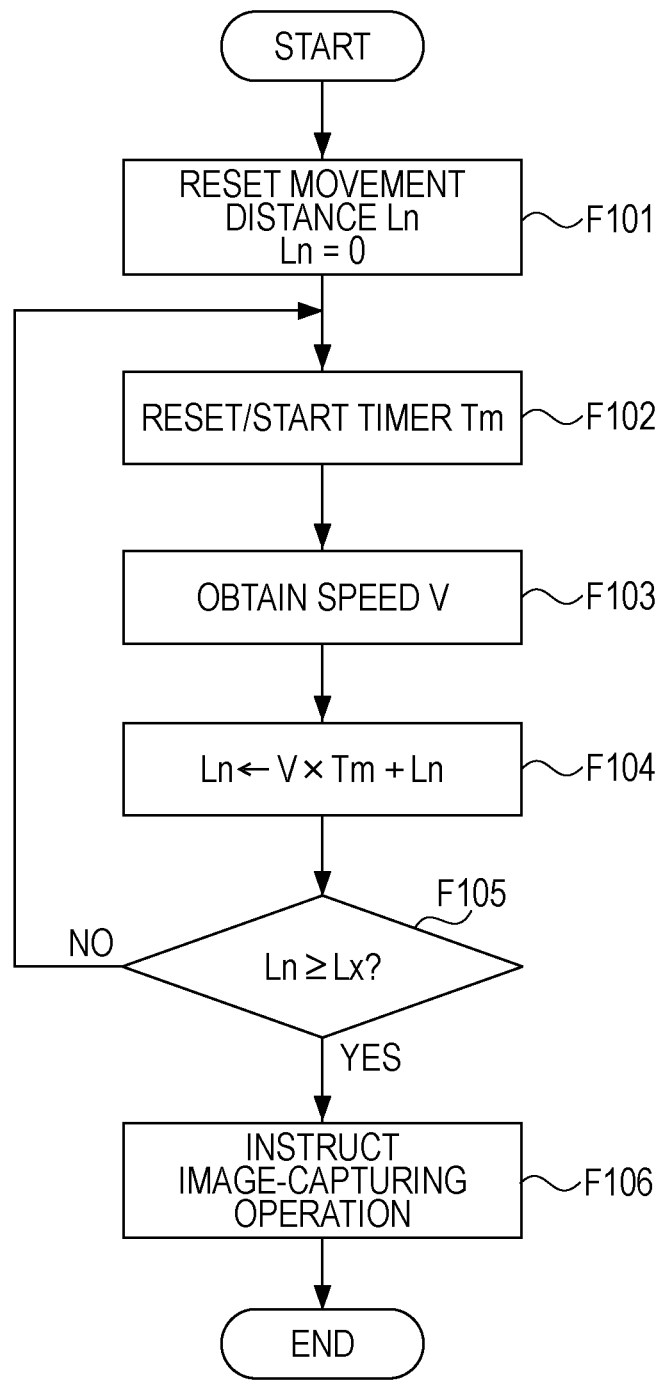
FIG. 4 is a flowchart of the automatic image-capturing processing operation example I according to the embodiment of the present invention.

The processing shown in FIG. 4 is processing for controlling one image-capturing operation. As a result of repeating the processing from the start to the end in FIG. 4, automatic image capturing is performed in a continued manner. This processing is performed in accordance with a program stored in a ROM contained in the system controller (this also applies to the processing shown in FIGS. 5, 6, 7, 10, 13 and 14 (to be described later)).

In step F101, the system controller 2 performs processing for resetting a variable Ln indicating the distance moved by the image-capturing apparatus 1 to an initial value 0 and for setting the movement distance Ln=0.

Then, in step F102, the system controller 2 resets a timer Tm, which is an internal timer, in order to set a count value=0 and also, starts the counting of the timer Tm.

Next, in step F103, the system controller 2 obtains the current speed V of the image-capturing apparatus 1 (the automobile having the image-capturing apparatus 1 installed therein, etc.) from the speed detector 10.

In step F104, the system controller 2 computes a movement distance on the basis of the timer Tm in which counting has started in step F102 and on the basis of the speed V of the image-capturing apparatus 1, which is obtained in step F103. That is, on the basis of (speed V)×(time period Tm), the movement distance in the processing period of steps F102 to F104 is determined. By adding the current movement distance Ln to the above movement distance, a new movement distance Ln is set.

At the initial processing point in time, Ln=0, and therefore, Ln=(speed V)×(time period Tm)+0. Thereafter, processing of steps F102, F103, and F104 is repeated through step F105. At the processing point in time of step F104, the movement distance during steps F102 to F104 is determined by (speed V)×(time period Tm). Therefore, by adding the current movement distance Ln to the above movement distance in order to determine a new movement distance Ln, the movement distance Ln is a total movement distance after the processing in step F101 has started.

In step F105, the system controller 2 determines whether or not the current movement distance Ln determined in step F104 has reached a predetermined distance Lx shown in FIG. 3B.

When the system controller 2 determines in step F105 that the current movement distance Ln has not reached the distance Lx, the process returns to step F102, and processing of steps F102, 103, and F104 described above is performed.

When the movement distance Ln reaches the distance Lx, the system controller 2 causes the process to proceed to step F106. In step F106, the system controller 2 issues instructions for performing an image-capturing operation. That is, an operation of obtaining captured image data by the image-capturing unit 3, predetermined signal processing, such as a compression process, by the image-capturing controller 4, an operation of transferring to the storage unit 8, and an operation of recording on a recording medium in the storage unit 8 are performed, and thus image capturing of one still image is performed.

After the performance of the image-capturing operation in step F106 has been instructed, the system controller 2 performs the processing of FIG. 4 again starting from step F101.

According to the processing of FIG. 4, an image-capturing operation is performed in accordance with instructions for performing an image-capturing operation issued in step F106 at a time at which it is determined in step F105 that the image-capturing apparatus 1 has moved a distance equal to or greater than the distance Lx from the place where the image-capturing apparatus 1 performed the previous image-capturing operation.

That is, each of points in time P1, P2, P3 . . . P9 of FIG. 3A is an image-capturing instruction time in step F106. Then, as a result, the distance interval of the places at which image capturing is performed at each time is an approximately fixed distance interval, which is a distance Lx as shown in FIG. 3B.

As described above, as a result of automatic image capturing being performed at approximately fixed distance intervals, which are each the distance Lx, captured image data of scenery at approximately fixed distance intervals is stored, which is preferable as a drive log.

4. Automatic Image-Capturing Processing Operation Example II

In the automatic image-capturing processing operation example I described with reference to FIG. 4, while the image-capturing apparatus 1 is moving, image-capturing operations are performed at distance intervals, which are each approximately the distance Lx. By setting the distance interval at which an image-capturing operation is performed in this manner to be approximately fixed, it is possible to store captured image data in which the state of the subject has changed.

However, if an image-capturing operation is performed only in response to an interval that is equal to or greater than the distance Lx being reached after the image-capturing apparatus 1 performed the previous image-capturing operation, there is a case in which an image-capturing operation is performed too frequently.

For example, when an automobile having the image-capturing apparatus 1 is moving at a high speed along a highway or the like, it is considered that the automobile might travel the distance Lx or more in a very short time period. In that case, image capturing is performed very frequently, and a large amount of captured image data is recorded in the storage unit 8 in a short time.

For the drive log camera or the life log camera for recording the traveling of the automobile and everyday life of the user, if captured image data is recorded too frequently in the storage unit 8, the available capacity of the storage unit 8 could become insufficient. In particular, each place passed during high-speed movement may not be of much value as an image to the user.

Therefore, whereas automatic image capturing is basically performed at intervals of the distance Lx as in the above-described automatic image-capturing processing operation example I, the following processing operation is considered in which, during high-speed movement, image capturing is not performed too frequently and the amount of captured image data to be recorded in the storage unit 8 is reduced.

A description will be given below, with reference to FIG. 5, of the processing of the system controller 2 for implementing such a processing operation.

Figure 5:
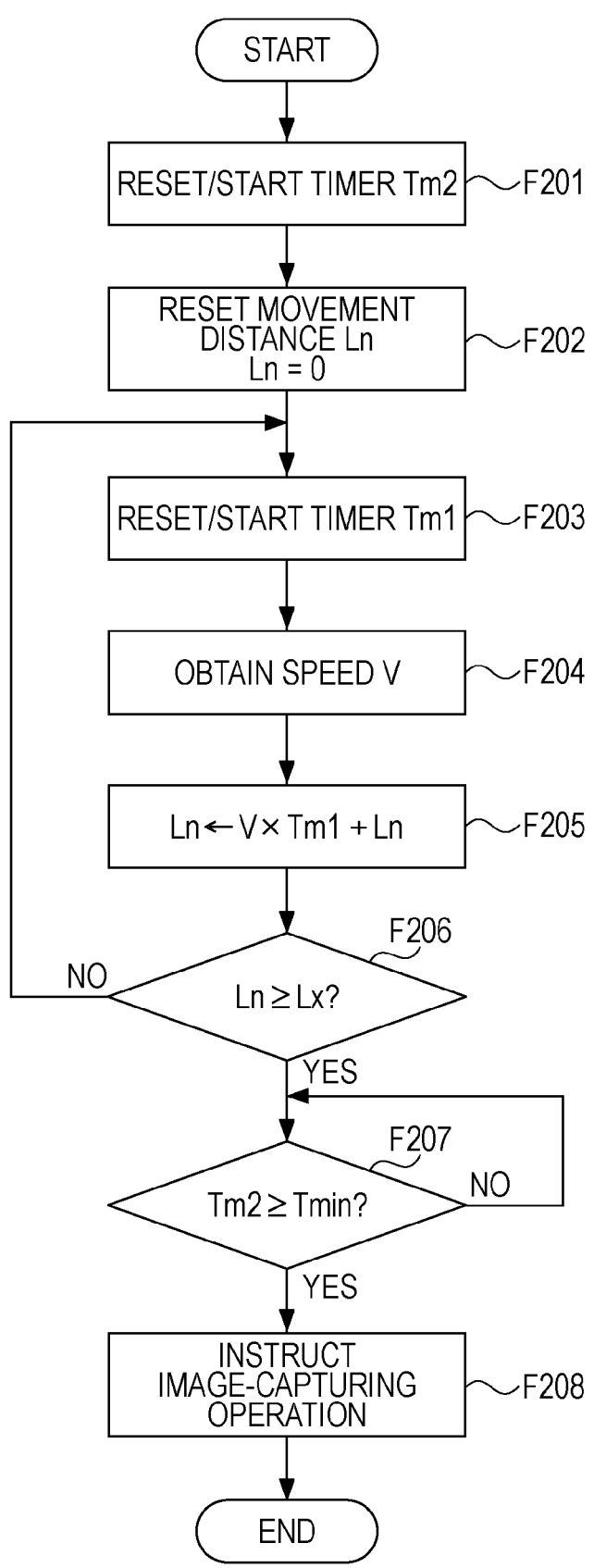
FIG. 5 is a flowchart of an automatic image-capturing processing operation example II according to the embodiment of the present invention.

The system controller 2 repeats the processing of FIG. 5 during the execution period of an automatic image-capturing operation.

Initially, in step F201, the system controller 2 resets a timer Tm2, which is an internal timer, in order to set the timer Tm2=0, and causes the counting of the timer Tm2 to be started.

The timer Tm2 causes the counting to be started immediately after an image-capturing operation is performed in the image-capturing apparatus 1, and is used to determine whether a predetermined time period has passed from the time when the image-capturing operation was performed in step F207 (to be described later).

Then, in steps F202 to F206, the system controller 2 performs the same processing operations as the processing operations from steps F101 to F105 described with reference to FIG. 4.

That is, initially, the system controller 2 performs processing for resetting the movement distance Ln of the image-capturing apparatus 1 to an initial value 0, and performs processing for resetting the timer Tm1, which is an internal timer, to an initial value 0 and starting counting. Then, processing for obtaining the speed V supplied from the speed detector 10 as the speed V of the image-capturing apparatus 1, multiplying the value of the speed V with the value of the timer Tm1, and adding the value of the movement distance Ln to the value of the multiplied result is performed. After the movement distance Ln of the image-capturing apparatus 1 is computed in the manner described above, a process for determining whether or not the movement distance Ln has reached the distance Lx is performed. When a negative result is obtained, the process returns to step F203. Then, until a determination result that the movement distance Ln has reached the distance Lx at a certain point in time, processing of step F203→step F204→step F205→step F206→step F203→ . . . is repeated.

Then, when the determination result that the movement distance Ln has a magnitude equal to or greater than the distance Lx is obtained, the process proceeds to step F207.

In step F207, the system controller 2 compares the count value of the timer Tm2 with a preset shortest waiting time period Tmin. That is, it is determined whether or not the shortest waiting time period has passed from the time of the previous image capturing.

The shortest waiting time period Tmin is a time period that is provided as a minimum time period after which an image-capturing operation may be performed even if the image-capturing apparatus 1 has already moved a distance equal to or greater than the distance Lx after the image-capturing apparatus 1 performed the previous image-capturing operation.

If the count value of the timer Tm2 has not reached the shortest waiting time period Tmin, the system controller 2 waits in step F207 until the shortest waiting time period Tmin is reached.

Then, when the timer Tm2 has reached the shortest waiting time period Tmin or more at a certain point in time, the system controller 2 causes the process to proceed to step F208.

In step F208, the system controller 2 issues instructions for performing an image-capturing operation. That is, the system controller 2 issues instructions for causing the image-capturing unit 3 to capture an image of a subject, and causes the image-capturing controller 4 to retrieve the captured image data of one frame, to perform predetermined processing thereon, and to transfer the captured image data to the storage unit 8.

In the storage unit 8, a process for recording the transferred captured image data of one frame as a still image on a recording medium is performed.

Thereafter, the system controller 2 repeats the processing of FIG. 5 again starting from step F201.

That is, according to the processing of FIG. 5, an image-capturing operation is performed when the movement of the distance Lx is detected. If the shortest waiting time period Tmin has not passed from the previous image-capturing timing even if the movement of the distance Lx is detected, the image-capturing operation is performed after waiting for the passage of the shortest waiting time period Tmin.

For this reason, even if the automobile is traveling at a high speed and the distance Lx is traveled too quickly, in that case, image capturing at intervals of a fixed distance is not performed, the distance intervals becoming wide to some extent, but image capturing at certain times is performed.

As a result, if the above is practised while image capturing is usually performed at intervals of fixed distances, during high-speed traveling, the case in which image capturing is performed too frequently can be avoided, and the amount of captured image data to be recorded in the storage unit 8 can be reduced to an appropriate amount.

5. Automatic Image-Capturing Processing Operation Example III

In the above-described automatic image-capturing processing operation examples I and II of FIGS. 4 and 5, while the image-capturing apparatus 1 is moving, captured image data in which the state of the subject has changed is obtained by performing an image-capturing operation in response to the distance Lx or more being passed after the image-capturing apparatus 1 performed the previous image-capturing operation.

Furthermore, in the automatic image-capturing processing operation example II of FIG. 5, when the movement speed of the image-capturing apparatus 1 is high and the image-capturing apparatus 1 moves the distance Lx or more in a short time, in order to prevent a large amount of captured image data from being recorded in the storage unit 8, an image-capturing operation is performed when the shortest waiting time period Tmin or more has passed after the image-capturing apparatus 1 performed the previous image-capturing operation.

As described above, in the automatic image-capturing processing operation example II, it is possible to store captured image data in which the state of a subject has changed, and by providing the shortest waiting time period Tmin in such a manner as to cope with a case in which the speed of the image-capturing apparatus 1 is high, the amount of captured image data to be recorded in the storage unit 8 is reduced.

However, usually, regarding the speed at which an automobile travels, the speed is considered to vary frequently, for example, becoming high or low.

For example, when the speed of the automobile in which the image-capturing apparatus 1 is disposed is low or the automobile is stopped, the image-capturing apparatus 1 is moving at a low speed or is stopped. Then, it takes a considerable amount of time to move a distance equal to or greater than the distance Lx from the place where the image-capturing apparatus 1 performed the previous image-capturing operation, or it is difficult to move a distance equal to or greater than the distance Lx, and thus a case may occur in which an image-capturing operation time is not reached soon enough.

At such a time, if an image-capturing operation is not performed because the image-capturing apparatus 1 has not moved a distance equal to or greater than the distance Lx, this is not so appropriate for the intended use of the life log camera for recording the daily life of the user.

Furthermore, even if not accompanied by the movement of a distance, the scenery around the subject may change with the passage of time. As a consequence, even if the distance has not changed much, the user has a possibility of obtaining a valuable image for the drive log or life log.

Therefore, it is considered that a fixed time interval (longest waiting time) is provided as a time interval at which image-capturing operations are performed in such a manner as to deal with a case in which the movement speed of the image-capturing apparatus 1 is low or the image-capturing apparatus 1 is stopped. That is, the following processing operation is considered in which, whereas automatic image capturing is basically performed at intervals of the distance Lx as in the above-described automatic image-capturing processing operation example I, the case in which an image-capturing time is not reached due to a situation of low-speed traveling or stopping does not occur.

A description will be given below, with reference to FIG. 6, of the processing of the system controller 2 for implementing such a processing operation. During the execution period of an automatic image-capturing operation, the system controller 2 repeatedly performs the processing of FIG. 6.

Initially, in step F301, the system controller 2 resets a timer Tm2, which is an internal timer, in order to set the timer Tm2=0, and causes the counting of the timer Tm2 to be started.

The timer Tm2 is used to start counting immediately after the image-capturing operation is performed in the image-capturing apparatus 1, and is used to determine whether or not a predetermined time period or more has passed from the time when the image-capturing operation was performed in step F307 (to be described later).

Thereafter, the system controller 2 performs the processing operations from steps F302 to F305, which are the same processing operations as steps F202 to F205 described with reference to FIG. 5 above.

That is, initially, the system controller 2 resets the timer Tm2, which is an internal timer, to an initial value 0 and thereafter causes counting to be started. Then, the movement distance Ln of the image-capturing apparatus 1 is reset to an initial value 0, and after the timer Tm1, which is an internal timer, is reset to an initial value 0, counting is started. Furthermore, processing for obtaining the speed V supplied from the speed detector 10 as the speed V of the image-capturing apparatus 1, for multiplying the value of the speed V with the value of the timer Tm1, and for adding the value of the multiplied result to the value of the movement distance Ln is performed. In the manner described above, the movement distance Ln of the image-capturing apparatus 1 is computed.

Then, in step F306, the system controller 2 determines whether or not the movement distance Ln of the image-capturing apparatus 1 has reached the distance Lx.

When it is determined in step F306 that the movement distance Ln has reached the distance Lx, the process proceeds to step F308.

In step F308, the system controller 2 issues instructions for performing an image-capturing operation similarly to the process of step F208 of FIG. 4 above.

That is, the system controller 2 issues instructions for causing the image-capturing unit 3 to capture an image of a subject, and performs processing for causing the image-capturing controller 4 to retrieve the captured image data of one frame, to perform predetermined processing thereon, transferring the captured image data to the storage unit 8, and recording, as a still image, the transferred captured image data of one frame on a recording medium of the storage unit 8.

Figure 6:
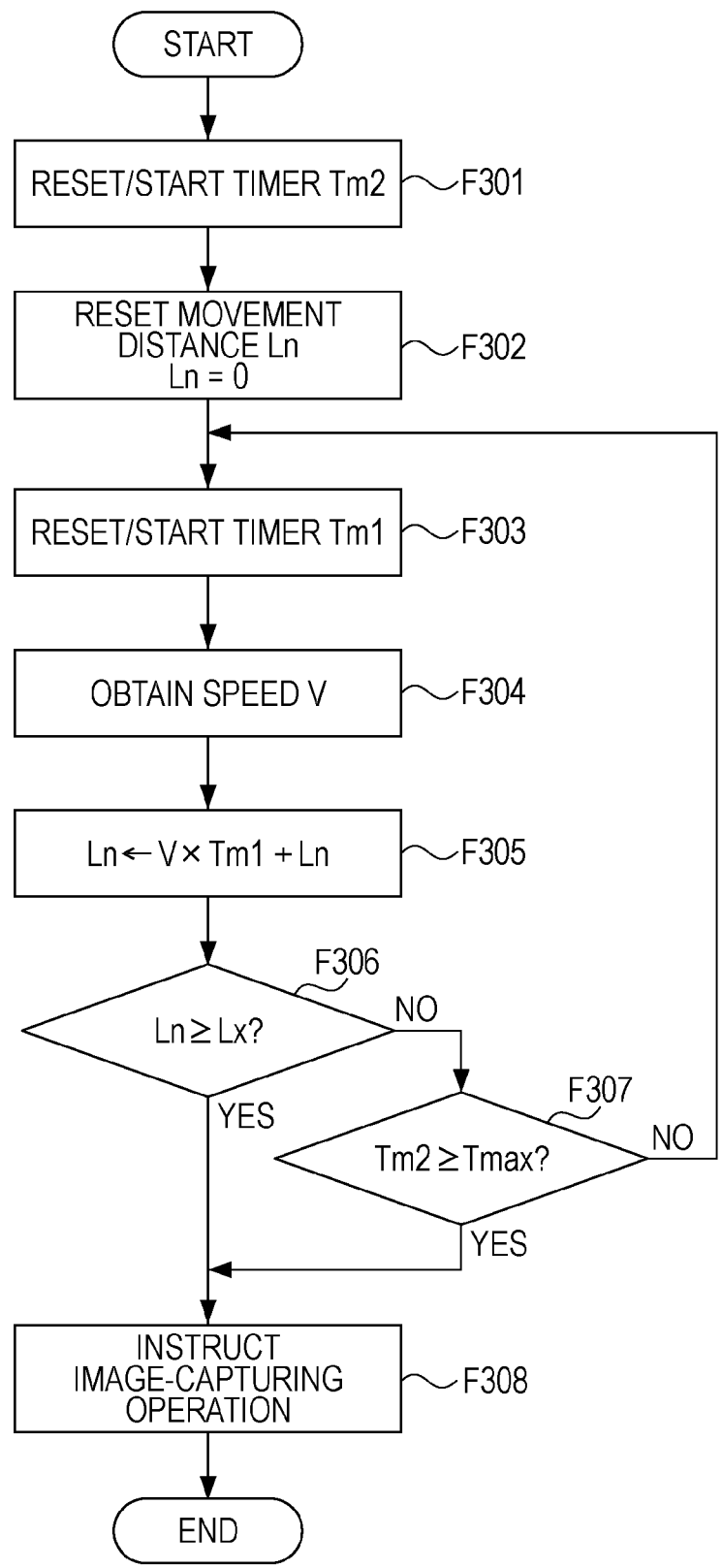
FIG. 6 is a flowchart of an automatic image-capturing processing operation example III according to the embodiment of the present invention.

Then, the processing of FIG. 6 is repeated starting from step F301.

On the other hand, when it is determined in step F306 that the movement distance Ln has not yet reached the distance Lx, the system controller 2 causes the process to proceed to step F307.

In step F307, the system controller 2 determines whether or not the count value of the timer Tm2 is greater than the longest waiting time period Tmax.

The longest waiting time period refers to that which is set as a time at which image capturing is performed even if the image-capturing apparatus 1 has not moved a distance equal to or greater than the distance Lx from the place where the image-capturing apparatus 1 performed the previous image-capturing operation.

When the system controller 2 determines that the count value of the timer Tm2 is smaller than the longest waiting time period Tmax, the process returns to step F303.

However, when it is determined in step F306 that the movement distance Ln has not reached the distance Lx, but it is determined in step F307 that the longest waiting time period is reached, the process proceeds to step F308, where the performance of an image-capturing operation is instructed as described above. As a result, even if the movement distance Ln has not reached the distance Lx, image capturing is performed.

Thereafter, the system controller 2 returns to step F301, where processing is repeated.

According to the above-described processing of FIG. 6, similarly to the processing of FIGS. 4 and 5 described earlier, an image-capturing operation is performed in response to the image-capturing apparatus 1 being moved a distance equal to or greater than the distance Lx from the place where the image-capturing apparatus 1 performed the previous image-capturing operation, and thus captured image data in which the state of the subject has changed can be obtained.

Furthermore, when the movement of the distance Lx or more is not performed soon enough, such as when the speed of the image-capturing apparatus 1 is low or the image-capturing apparatus 1 is stopped, if the longest waiting time period Tmax has passed from the time when the previous image capturing was performed, image capturing is performed regardless of the moved distance, thereby making it possible to avoid a situation in which an image-capturing operation is not performed for a long time.

As a result, image capturing suitable as a drive log and a life log is implemented.

Furthermore, if image capturing is not performed due to, for example, a stopped state, a case in which the failure of the image-capturing apparatus 1 is suspected by the user can occur, and such a situation can be avoided.

6. Automatic Image-Capturing Processing Operation Example IV

In the above-described automatic image-capturing processing operation example II of FIG. 5, by performing an image-capturing operation in response to the shortest waiting time period Tmin being passed after the image-capturing apparatus 1 has moved the distance Lx or more from the place where the image-capturing apparatus 1 performed the previous image-capturing operation has been performed so as to cope with a case in which the speed of the image-capturing apparatus 1 is high, the amount of the captured image data to be recorded in the storage unit 8 is reduced.

Furthermore, in the automatic image-capturing processing operation example III of FIG. 6, when the image-capturing apparatus 1 has not moved the distance Lx or more from the place where the image-capturing apparatus 1 performed the previous image-capturing operation in such a manner as to cope with a case in which the speed of the image-capturing apparatus 1 is low or the image-capturing apparatus 1 is stopped, an image-capturing operation is performed in response to the passage of the longest waiting time period Tmax. As a result of the above, it is possible to obtain captured image data in which the state on the subject side could have changed as a result of an elapse of a time period after the image-capturing apparatus 1 performed the previous image-capturing operation.

However, as described earlier, usually, there are cases in which the speed of an automobile increases or decreases, or sometimes the automobile is stopped while traveling, and the speed changes frequently.

For example, when an automobile travels along a highway, it is considered that the automobile travels at a speed higher than that in an ordinary road. When the automobile gets off halfway to an ordinary road and travels, there are cases in which the speed becomes low or the automobile is stopped due to congestion of the road or a red traffic light.

Therefore, the following processing operation is considered in which both the processing operation in which, in response to the above case, the image-capturing apparatus 1 performs an image-capturing operation in response to the passage of the shortest waiting time period Tmin after the image-capturing apparatus 1 moves the distance Lx or more from the place where the image-capturing apparatus 1 performed the previous image-capturing operation, and a processing operation in which the image-capturing apparatus 1 performs an image-capturing operation in response to the passage of the longest waiting time period Tmax when the image-capturing apparatus 1 has not moved the distance Lx or more, are combined.

A description will be given below, with reference to FIG. 7, the processing of the system controller 2 for implementing such a processing operation.

Figure 7:
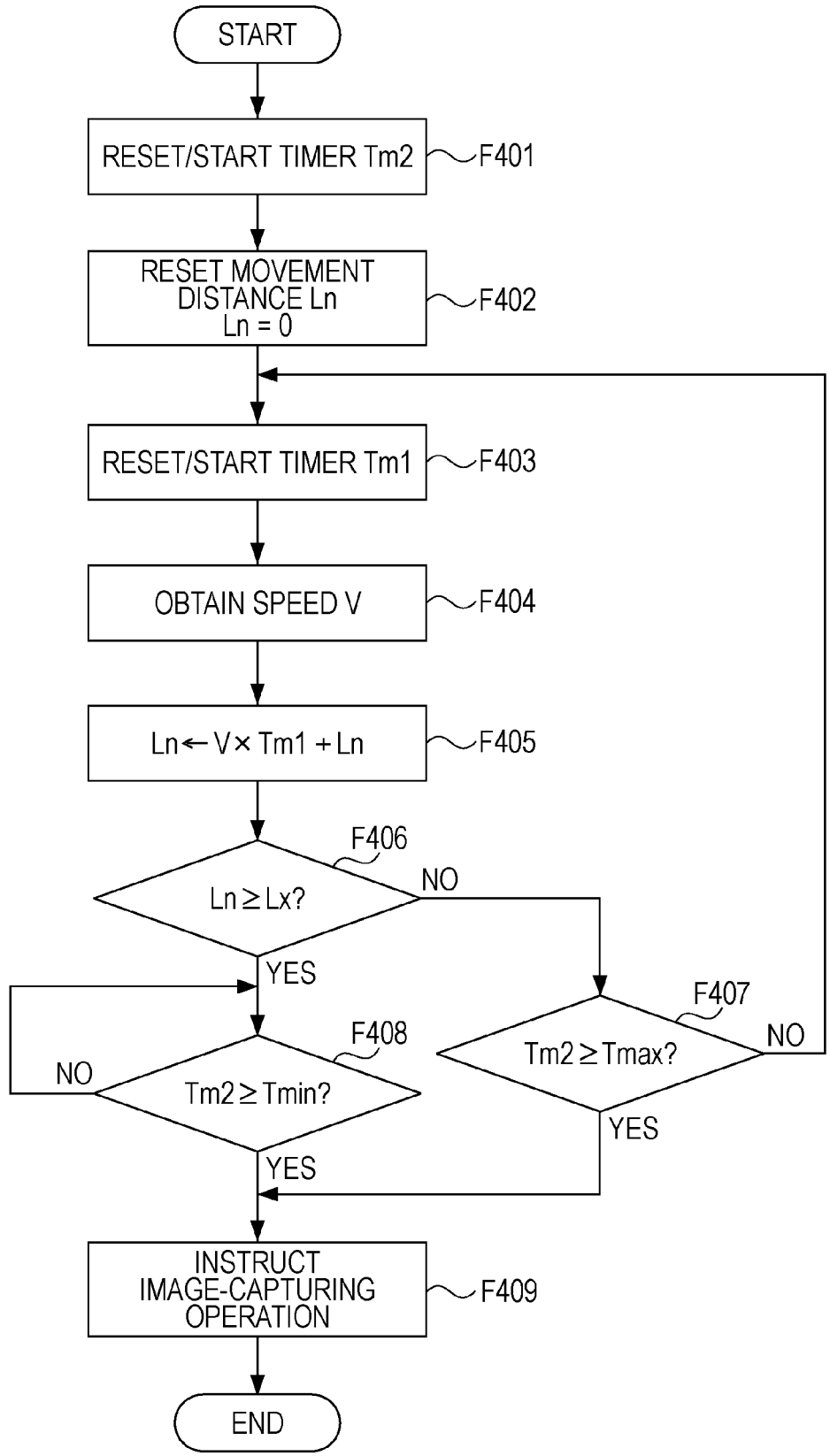
FIG. 7 is a flowchart of an automatic image-capturing processing operation example IV according to the embodiment of the present invention.

Initially, in FIG. 7, the system controller 2 performs the processing operations from steps F401 to F406, which are the same processing operations as steps F201 to F206 in FIG. 5 described earlier.

Then, when it is determined in step F406 that the movement distance Ln has a magnitude equal to or greater than the distance Lx, the system controller 2 causes the process to proceed to step F408.

In step F408, similarly to step F207 described with reference to FIG. 5, it is determined whether or not the time period Tm2 is greater than the shortest waiting time period Tmin.

That is, the system controller 2 performs a process for determining whether or not the shortest waiting time period Tmin that is provided as a minimum in order to perform an image-capturing operation after the image-capturing apparatus 1 has moved a distance equal to or greater than the distance Lx after the image-capturing apparatus 1 performed the previous image-capturing operation. Then, when it is determined that the shortest waiting time period Tmin has not passed, the system controller 2 waits in step F408 until the count value of the timer Tm2 becomes equal to or greater than the shortest waiting time period Tmin.

Then, when it is determined that the shortest waiting time period has passed, the system controller 2 causes the process to proceed to step F409.

Furthermore, when it is determined in step F406 that the movement distance Ln has not reached the distance Lx, the system controller 2 causes the process to proceed to step F407. Similarly to step F307 described with reference to FIG. 6, in step F407, the system controller 2 determines whether or not the count value of the timer Tm2 has reached the longest waiting time period Tmax. If the longest waiting time period has not passed, the process returns to step F403.

On the other hand, if the longest waiting time period Tmax has passed even while the image-capturing apparatus 1 is not recognized to have moved the distance Lx or more from the place where the image-capturing apparatus 1 performed the previous image-capturing operation, the process proceeds from step F407 to step F409.

In step F409, the system controller 2 performs the same process as the process of step F208 of FIG. 5 described above, and performs a predetermined process on the captured image data of one frame and thereafter, performs a process for recording, as a still image, the captured image data of one frame on a recording medium of the storage unit 8.

According to such a processing of FIG. 7, similarly to the processing operations of FIGS. 5 and 6 described above, the image-capturing apparatus 1 basically performs an image-capturing operation in response to the image-capturing apparatus 1 being moved a distance equal to or greater than the distance Lx from the place where the image-capturing apparatus 1 performed the previous image-capturing operation.

However, by performing an image-capturing operation in response to the passage of the shortest waiting time period Tmin or more, it is possible to avoid image capturing from being excessively performed during high-speed movement, and thus the amount of captured image data to be recorded in the storage unit 8 is reduced.

Furthermore, by performing an image-capturing operation in response to the passage of the longest waiting time period Tmax or more, a situation in which image capturing is not performed soon enough due to a low-speed movement or a stopped state can be avoided.

7. Automatic Image-Capturing Processing Operation Example V

In the above-described automatic image-capturing processing operation examples I, II, III, and IV of FIGS. 4, 5, 6, and 7, an image-capturing operation is performed in response to the image-capturing apparatus 1 being moved the distance Lx or more after the image-capturing apparatus 1 performed the previous image-capturing operation, and the captured image data is recorded in the storage unit 8.

However, if the image-capturing apparatus 1 performs an image-capturing operation in response to the image-capturing apparatus 1 being moved the distance Lx or more, it is considered that the amount of captured image data that is captured during that period could be a considerable amount. Furthermore, when the movement speed of the image-capturing apparatus 1 is high and the image-capturing apparatus 1 moves the distance Lx or more in a short time, the image-capturing operation is frequently performed in a short time, and it is considered that the amount of captured image data to be recorded in the storage unit 8 increases.

Since the recording capacity of the storage unit 8 is limited, the reduction in the amount of captured image data to be recorded in the storage unit 8 is preferable in the image-capturing apparatus 1.

The technique for reducing the amount of data should preferably be such that, for example, threshold values are provided for the time interval at which an image-capturing operation is performed, the image size of captured image data is decreased when the interval at which the image-capturing operation is performed is short, the image size of the captured image data is increased when the interval at which the image-capturing operation is performed is long, and the captured image data is recorded in the storage unit 8.

Such an automatic image-capturing processing operation will be described below.

Figure 8:
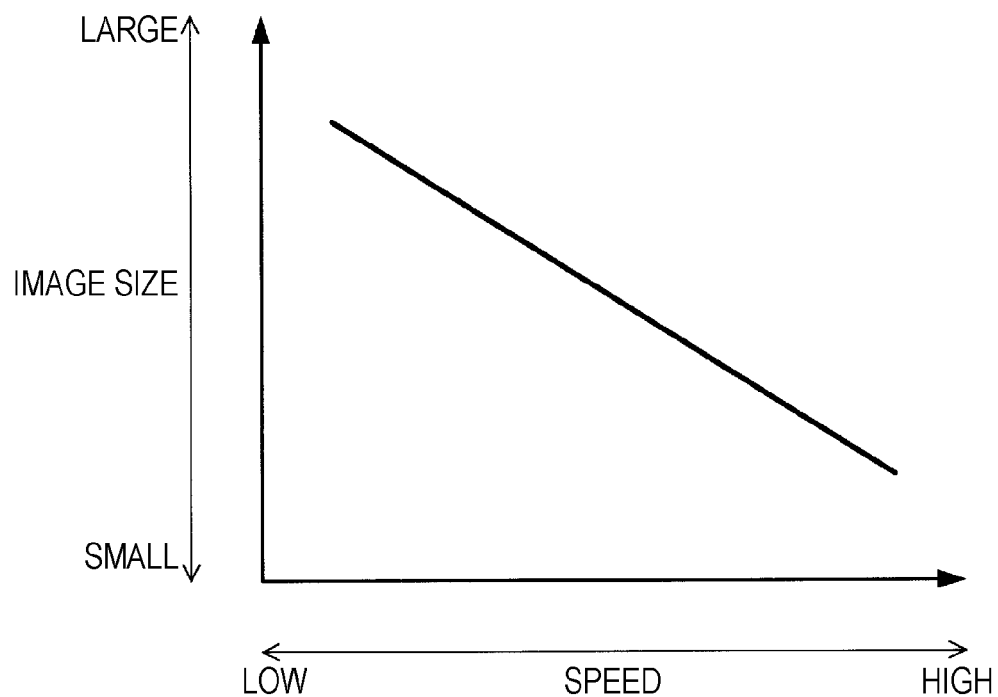
FIG. 8 is an illustration of an automatic image-capturing processing operation example V according to the embodiment of the present invention.

FIG. 8 shows the relationship between the movement speed of the image-capturing apparatus 1 and the image size when captured image data is to be recorded in the storage unit 8 in this embodiment, in which the horizontal axis indicates the image size and the horizontal axis indicates the speed.

In FIG. 8, if the movement speed of the image-capturing apparatus 1 is low, the image size is changed to be increased, and if the movement speed of the image-capturing apparatus 1 is high, the image size is changed to be decreased, and the captured image data is recorded in the storage unit 8. That is, when the movement speed is low, a long time is taken to reach a fixed distance, the image-capturing time interval becomes long, and the number of the image capturing chances decreases. Conversely, if the movement speed is high, a short time is taken to reach a fixed distance, the image-capturing time interval becomes short, the image-capturing time interval decreases, and image capturing is performed frequently. For this reason, by changing the size of the image size to be stored in response to the movement speed so that the higher the movement speed, the more the image size is decreased, it is possible to efficiently save the recording capacity of the storage unit 8 as described above.

Figure 9:
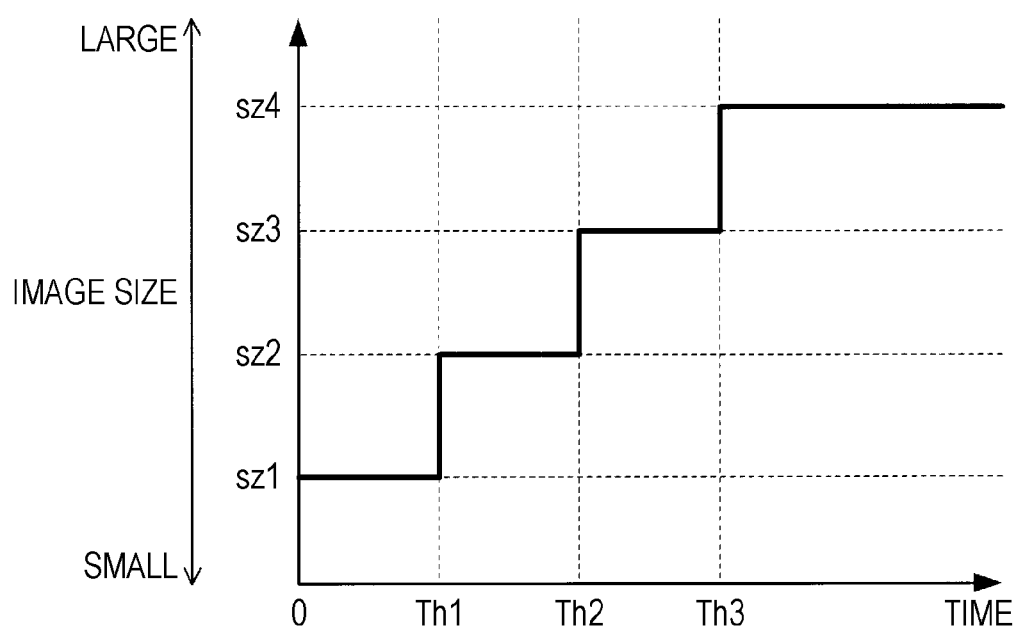
FIG. 9 is an illustration showing the automatic image-capturing processing operation example V according to the embodiment of the present invention.

FIG. 9 shows a specific technique of setting an image size. The horizontal axis indicates the image-capturing time interval, and the horizontal axis indicates the image size.

This case shows that a threshold value for a time interval in which an image-capturing operation is performed is provided, so that the image size of captured image data to be stored is changed on the basis of the threshold value.

As shown in the figure, for example, three threshold values are provided for the time interval at which an image-capturing operation is performed. On the basis of the threshold value of the time interval at which an image-capturing operation has been performed, captured image data to be stored is determined from among image sizes of four levels.

That is, when an image-capturing operation is performed in response to the image-capturing apparatus 1 being moved the distance Lx or more after the image-capturing apparatus 1 performed the previous image-capturing operation, in the case that the time interval is smaller than or equal to a threshold value Th1, which is the shortest threshold value, the captured image data is stored at an image size sz1.

Furthermore, if the image-capturing time interval is between a threshold value Th1 and a threshold value Th2, the captured image data is stored at an image size sz2. If the image-capturing time interval is between the threshold value Th2 and a threshold value Th3, the captured image data is stored at an image size sz3. If the image-capturing time interval is greater than or equal to the threshold value Th3, the captured image data is stored at an image size sz4.

A description will be given below, with reference to FIG. 10, of the processing of the system controller 2 for implementing such an operation.

Figure 10:
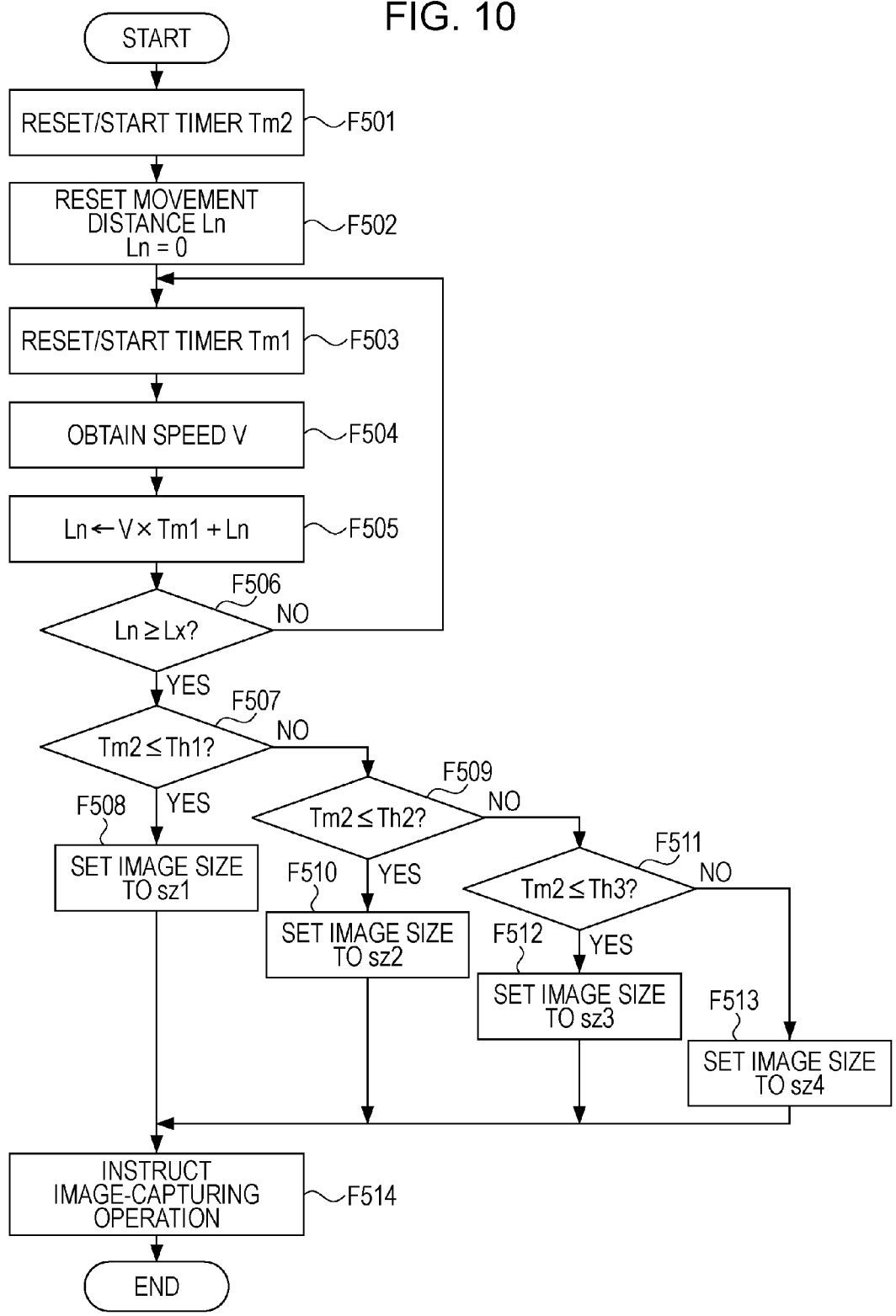
FIG. 10 is a flowchart of the automatic image-capturing processing operation example V according to the embodiment of the present invention.

Initially, in steps F501 to F506 in FIG. 10, the system controller 2 performs the same processing operations as the processing operations of steps F201 to F206 in FIG. 5 described earlier.

Then, when it is determined in step F506 that the distance Ln moved by the image-capturing apparatus 1 after the image-capturing apparatus 1 performed the previous image-capturing operation is a magnitude equal to or greater than the distance Lx, the system controller 2 causes the process to proceed to step F507.

In step F507, the system controller 2 performs a process for determining whether or not the count value of the timer Tm2 that started in step F501 is smaller than or equal to the threshold value Th1 of a time interval.

Then, when it is determined that the count value of the timer Tm2 is smaller than or equal to the threshold value Th1, the process proceeds to step F508.

In step F508, the system controller 2 instructs the image-capturing controller 4 to set the image size sz1, which is the smallest size among the sizes sz1 to sz4 of the captured image data shown in FIG. 9. Then, the process proceeds to step F514.

Furthermore, when it is determined in step F507 that the count value of the timer Tm2 is greater than the threshold value Th1, in step F509, the system controller 2 performs a process for determining whether or not the count value of the timer Tm2 is smaller than or equal to a threshold value Th2.

Then, when it is determined in step F509 that the count value of the timer Tm2 is smaller than or equal to the threshold value Th2, in step F510, the system controller 2 instructs the image-capturing controller 4 to set the image size sz2 as the size of captured image data. The image size sz2 is an image size that is large next to the image size sz1. Then, the process proceeds to step F514.

When it is determined in step F509 that the count value of the timer Tm2 is greater than the threshold value Th2, the process proceeds to step F511. In step F511, the system controller 2 performs a process for determining whether or not the count value of the timer Tm2 is smaller than or equal to a threshold value Th3.

When it is determined in step F511 that the count value of the timer Tm2 is smaller than or equal to the threshold value Th3, the system controller 2 causes the process to proceed to step F512, where the system controller 2 instructs the image-capturing controller 4 to set the image size sz3 as the size of the captured image data.

The image size sz3 is an image size that is the next largest image size after the image size sz2. The process then proceeds to step F514.

Furthermore, when it is determined in step F511 that the count value of the timer Tm2 is greater than the threshold value Th3, the system controller 2 causes the process to proceed to step F513, where the system controller 2 instructs the image-capturing controller 4 to set an image size sz4 as the size of the captured image data. The image size sz4 is the largest image size. The process then proceeds to step F514.

In step F514, the system controller 2 issues instructions for performing an image-capturing operation. That is, the system controller 2 instructs the image-capturing unit 3 to capture an image of a subject, and causes the image-capturing controller 4 to retrieve the captured image data of one frame, to perform predetermined process thereon, and to transfer the captured image data to the storage unit 8. At this time, the image-capturing controller 4 processes the captured image data having an image size set in one of steps F508, F510, F512, and F513. In the storage unit 8, a process is performed for recording the transferred captured image data of one frame as a still image on a recording medium.

The system controller 2 instructs the performance of an image-capturing operation in step F514, and then starts processing from step F501 again.

As described above, by changing the image size of captured image data to be stored in accordance with the image-capturing time interval, efficient use of the recording capacity of the storage unit 8 can be achieved.

The image obtained at a comparatively long time interval is considered to have a high value for the image, and storing such an image at a large size is preferable.

In this example, the captured image data is recorded in the storage unit 8 in such a manner as to be divided into image sizes of four levels. The captured image data may be divided into image sizes of two, three, five or more levels, and may be recorded.

8. Automatic Image-Capturing Processing Operation Example VI

In the above-described automatic image-capturing processing operation example V of FIG. 10, the image size is changed on the basis of the time interval after the image-capturing apparatus 1 performed the previous image-capturing operation, so that the amount of the captured image data to be recorded in the storage unit 8 is saved. However, a technique is also possible in which, by changing, rather than the image size, the compression ratio of captured image data on the basis of the time interval, the amount of captured image data to be recorded in the storage unit 8 is saved.

Here, an automatic image-capturing processing operation in which a compression ratio is changed in the manner described above will be described below.

Figure 11:
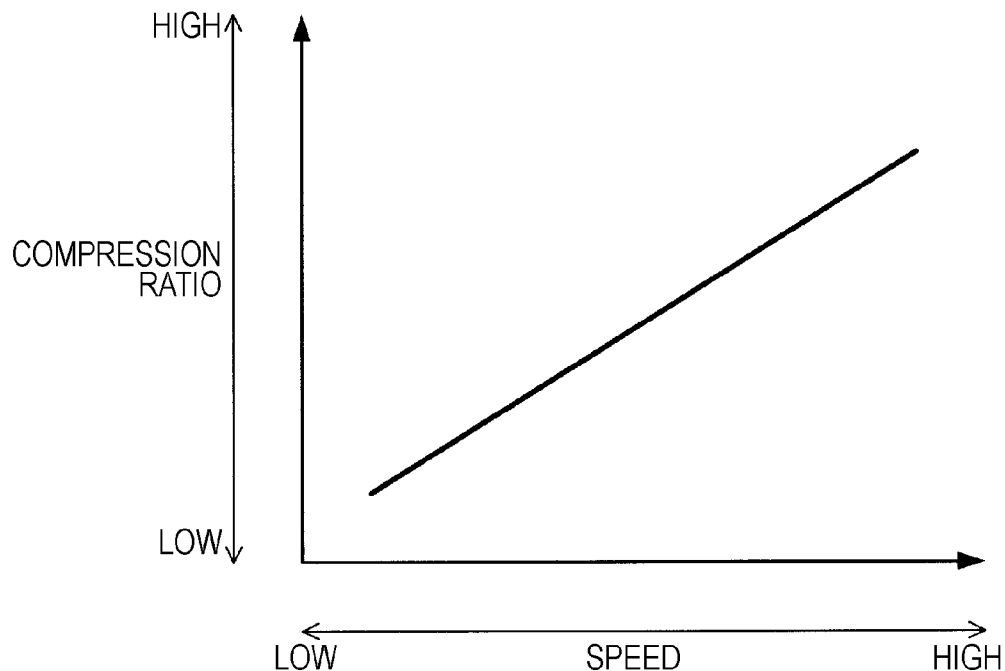
FIG. 11 is an illustration of an automatic image-capturing processing operation example VI according to the embodiment of the present invention.

FIG. 11 shows the relationship between the movement speed of the image-capturing apparatus 1 and the compression ratio of captured image data when the captured image data is to be recorded in the storage unit 8. The horizontal axis indicates the compression ratio, and the horizontal axis indicates the speed. As shown in FIG. 11, if the movement speed of the image-capturing apparatus 1 is low, it takes time to reach a fixed distance, and the number of image capturing chances decreases; therefore, the captured image data is recorded in the storage unit 8 at a low compression ratio (the amount of data is large and at a high image quality). On the other hand, as the movement speed increases, the time taken to reach a fixed distance becomes smaller, and the number of image capturing chance increases; therefore, the captured image data is recorded in the storage unit 8 at a high compression ratio (the amount of data is small and at a low image quality). As a result, it is possible to efficiently save the recording capacity of the storage unit 8 as in the example described with reference to FIG. 10 above.

Figure 12:
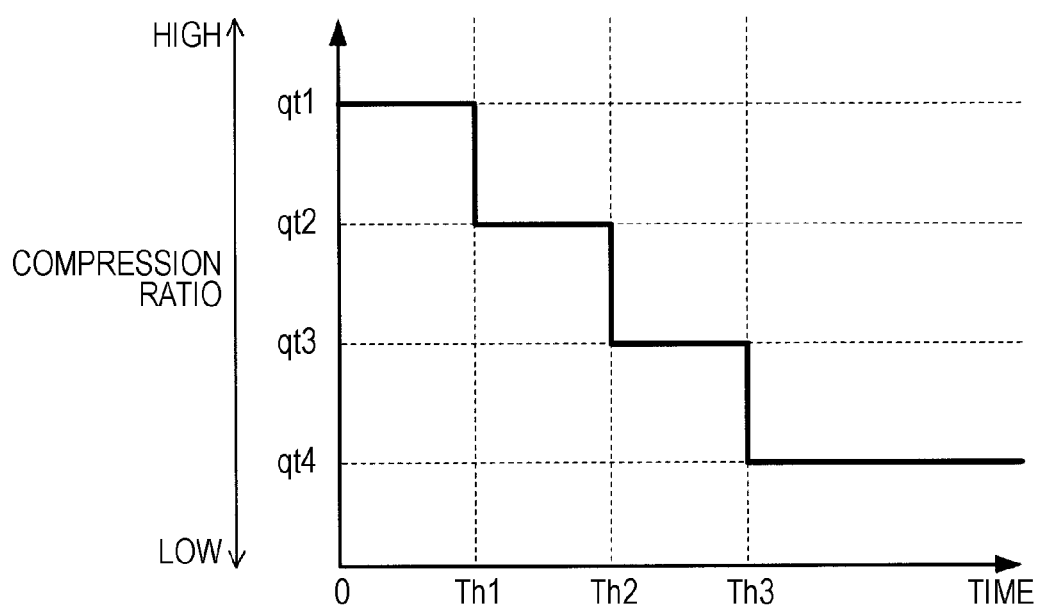
FIG. 12 is an illustration of the automatic image-capturing processing operation example VI according to the embodiment of the present invention.

A specific technique is shown in FIG. 12. The horizontal axis indicates the time, and the horizontal axis indicates the compression ratio. Threshold values are provided for the time interval in the case that an image-capturing operation is performed, and the compression ratio of captured image data to be stored is changed on the basis of the threshold value.

For example, three threshold values are provided for the time interval in the case that an image-capturing operation is performed, and on the basis of the threshold values for the time interval at which the image-capturing operation has been performed, compression ratios at four levels are determined with regard to the captured image data.

When the image-capturing apparatus 1 performs an image-capturing operation in response to the image-capturing apparatus 1 being moved the distance Lx or more after the image-capturing apparatus 1 performed the previous image-capturing operation, in the case that the time interval is smaller than or equal to the threshold value Th1, which is the shortest threshold value, the captured image data is compressed at the highest compression ratio qt1 and is stored.

Furthermore, if the image-capturing time interval is between the threshold value Th1 and the threshold values Th2, the captured image data is compressed at a compression ratio qt2 and is stored. If the image-capturing time interval is between the threshold value Th2 and the threshold value Th3, the captured image data is compressed at a compression ratio qt3 and is stored. If the image-capturing time interval is greater than or equal to the threshold value Th3, the captured image data is compressed at the lowest compression ratio qt4 and is stored.

A description will be given below, with reference to FIG. 13, of the processing of the system controller 2 for implementing such an operation.

Figure 13:
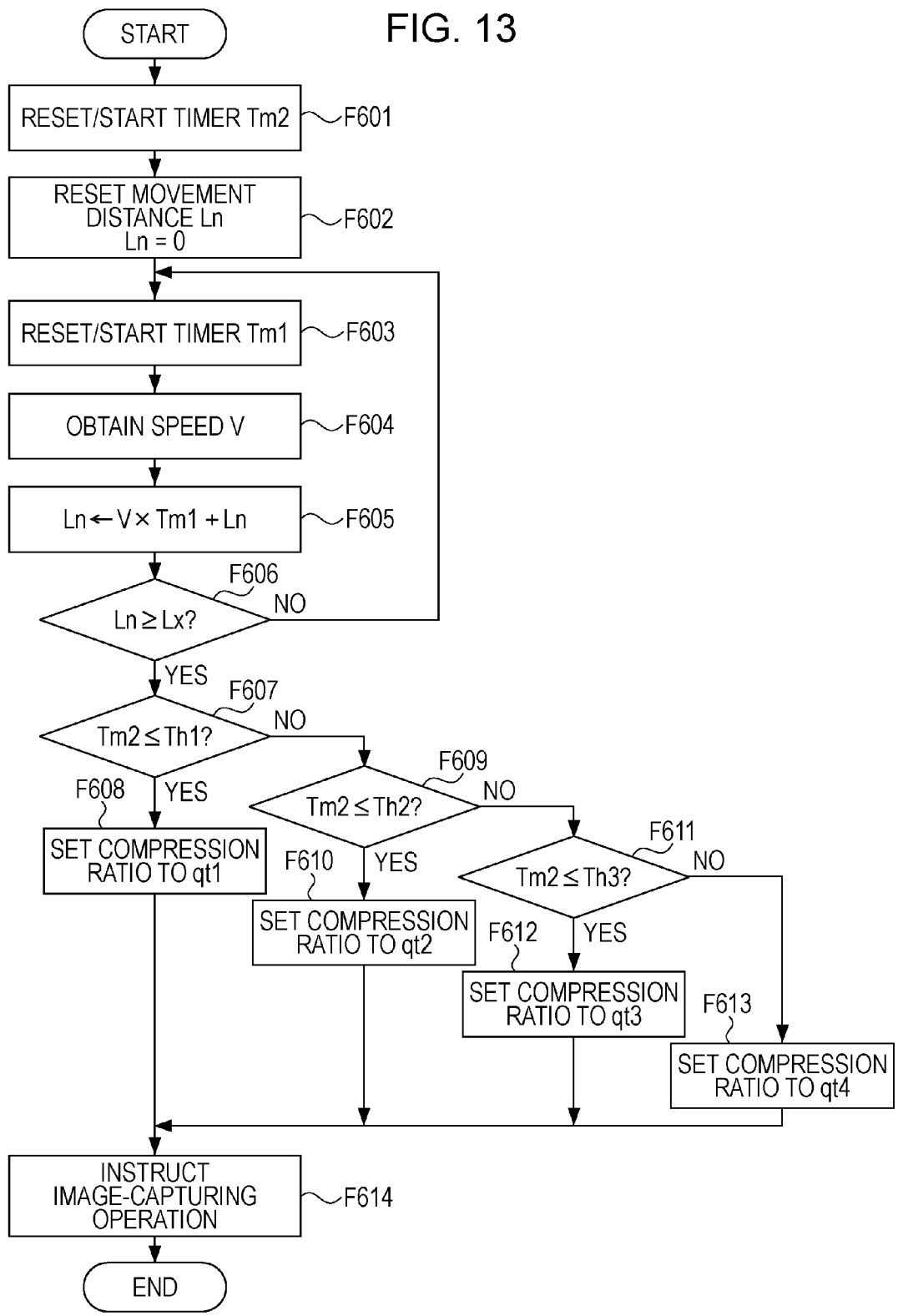
FIG. 13 is a flowchart of the automatic image-capturing processing operation example VI according to the embodiment of the present invention.

Initially, in steps F601 to F606 in FIG. 13, the system controller 2 performs the same processing operations as the processing operations of steps F201 to F206 in FIG. 5 described earlier.

Then, when it is determined in step F606 that the distance Ln moved by the image-capturing apparatus 1 after the image-capturing apparatus 1 performed the previous image-capturing operation is a magnitude equal to or greater than the distance Lx, the system controller 2 causes the process to proceed to step F607.

In step F607, the system controller 2 performs a process for determining whether or not the count value of the timer Tm2 that started in step F601 is smaller than or equal to the threshold value Th1 of the time interval. Then, when it is determined that the count value of the timer Tm2 is smaller than or equal to the threshold value Th1, the process proceeds to step F608.

In step F608, the system controller 2 indicates to the image-capturing controller 4 the highest compression ratio qt1 among the compression ratios qt1 to qt4 shown in FIG. 12. The process then proceeds to step F614.

Furthermore, when it is determined in step F607 that the count value of the timer Tm2 is greater than the threshold value Th1, in step F609, the system controller 2 performs a process for determining whether or not the count value of the timer Tm2 is smaller than or equal to the threshold value Th2.

Then, when it is determined in step F609 that the count value of the timer Tm2 is smaller than or equal to the threshold value Th2, in step F610, the system controller 2 indicates the compression ratio qt2 to the image-capturing controller 4. The compression ratio qt2 is a compression ratio that is the next lowest compression ratio after the compression ratio qt1. The process then proceeds to step F614.

Furthermore, when it is determined in step F609 that the count value of the timer Tm2 is greater than the threshold value Th2, the process proceeds to step F611. In step F611, the system controller 2 performs a process for determining whether or not the count value of the timer Tm2 is smaller than or equal to the threshold value Th3.

Then, when it is determined in step F611 that the count value of the timer Tm2 is smaller than or equal to the threshold value Th3, the system controller 2 causes the process to proceed to step F612, where the compression ratio qt3 is indicated to the image-capturing controller 4. The compression ratio qt3 is a compression ratio that is the next lowest compression ratio after the compression ratio qt2. The process then proceeds to step F614.

Furthermore, when it is determined in step F611 that the count value of the timer Tm2 is greater than the threshold value Th3, the system controller 2 causes the process to proceed to step F613, where the compression ratio qt4 is indicated to the image-capturing controller 4. The compression ratio qt4 is the lowest compression ratio.

The process then proceeds to step F614.

In step F614, the system controller 2 issues instructions for performing an image-capturing operation. That is, the system controller 2 instructs the image-capturing unit 3 to capture an image of a subject, and causes the image-capturing controller 4 to retrieve the captured image data of one frame, to perform a predetermined process thereon, and to transfer the captured image data to the storage unit 8. At this time, the image-capturing controller 4 performs a process for compressing the captured image data at a compression ratio that is set in one of steps F608, F610, F612, and F613. Then, in the storage unit 8, a process for recording the transferred captured image data of one frame as a still image on a recording medium is performed.

After the system controller 2 instructs the performance of an image-capturing operation in step F614, the image-capturing apparatus 1 starts processing from step F601 again.

As described above, by changing the compression ratio of the captured image data to be stored on the basis of the image-capturing time interval, the recording capacity of the storage unit 8 can be efficiently used.

Furthermore, it can be considered that an image obtained at a comparatively long time interval has a comparatively high value regarding the image, and storage of such an image at a low compression ratio at a high image quality is preferable.

In this example, regarding a process for compressing captured image data, switching is performed among the compression ratios at four levels. Alternatively, the captured image data may be switched among two, three, five or more levels.

Furthermore, in the case of achieving the highest image quality (in the case that the time interval is longest), the captured image data may be not compressed.

9. Automatic Image-Capturing Processing Operation Example VII

In the automatic image-capturing processing operation examples I, II, III, IV, V, and VI described thus far of FIGS. 4, 5, 6, 7, 10, and 13, an image-capturing operation is performed in response to the image-capturing apparatus 1 being moved the distance Lx or more after the image-capturing apparatus 1 performed the previous image-capturing operation, and captured image data of one frame is recorded as a still image in the storage unit 8.

However, it is considered that captured image data to be recorded in the storage unit 8 is recorded as moving images in addition to still images.

When a driving history and scenery of the daily life of a user are to be recorded as a drive log camera or a life log camera, making a record as moving images can produce a record having a higher sense of realism than one using still images. Furthermore, in still images, the time interval at which the image-capturing apparatus 1 performs an image-capturing operation is longer than in moving images, and there is a period in which an image of a subject is not captured. However, in moving images, since such a period in which it is difficult to capture an image of a subject is shorter than that in still images, it is possible to thoroughly record the daily life of the user, and a more preferable recording of the scenery of the daily life can be made.

However, when all the daily life of the user is to be recorded as moving images, a very large amount of captured image data is recorded in the storage unit 8, and it is considered that the recording capacity of the storage unit 8 is exceeded. Therefore, if captured image data to be recorded in the storage unit 8 is switched and recorded between still images and moving images in accordance with the situation, it is possible to save the recording capacity of the storage unit 8.

For example, a processing operation is also considered in which, when an image-capturing operation is performed in response to the image-capturing apparatus 1 being moved the distance Lx or more from the place where the image-capturing apparatus 1 performed the previous image-capturing operation, image capturing is performed in the form of moving images when image capturing is to be performed at a point in time shorter than or equal to a predetermined time interval, and image capturing is performed in the form of still images when image capturing is to be performed at a point in time longer than or equal to the predetermined time interval.

A description will be given below, with reference to FIG. 14, of the processing of the system controller 2 for implementing such a processing operation.

Figure 14:
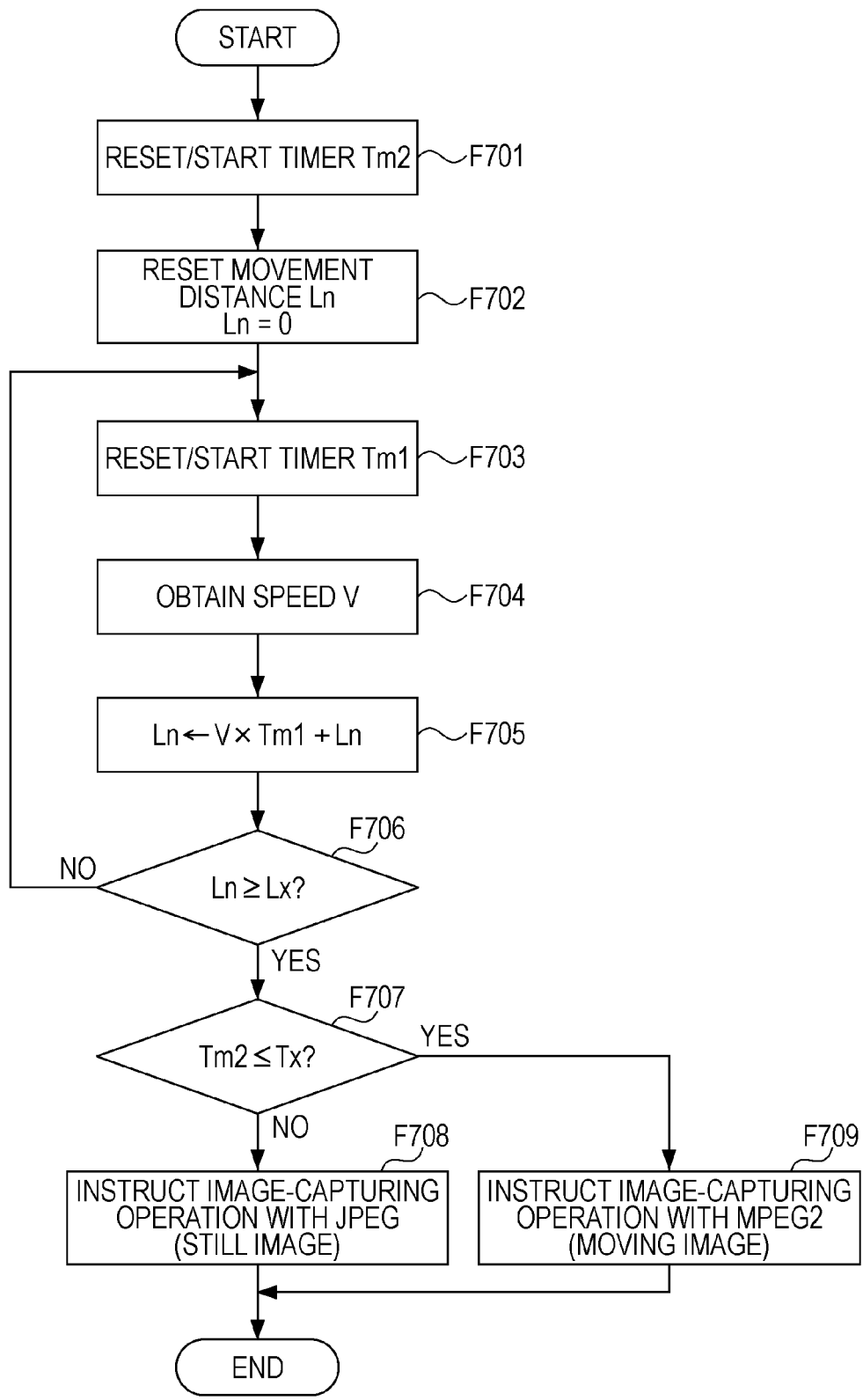
FIG. 14 is a flowchart of an automatic image-capturing processing operation example VII according to the embodiment of the present invention.
Figure 15:
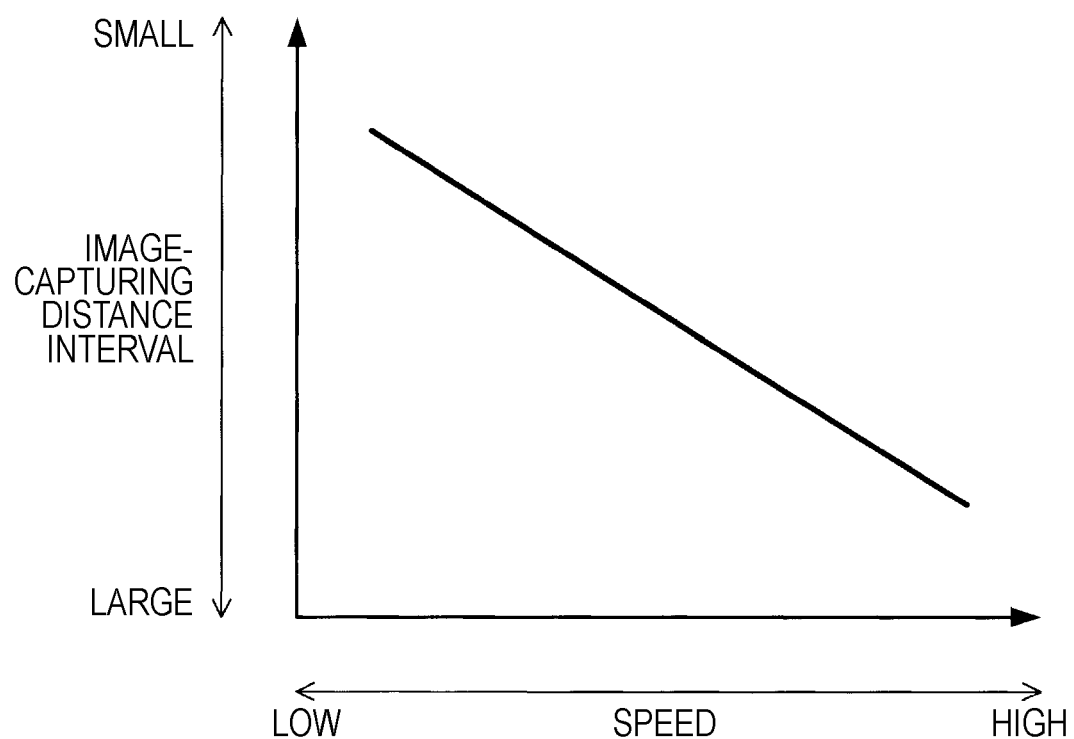
FIG. 15 is an illustration of an automatic image-capturing process in the image-capturing apparatus of the related art.
Figure 16A:
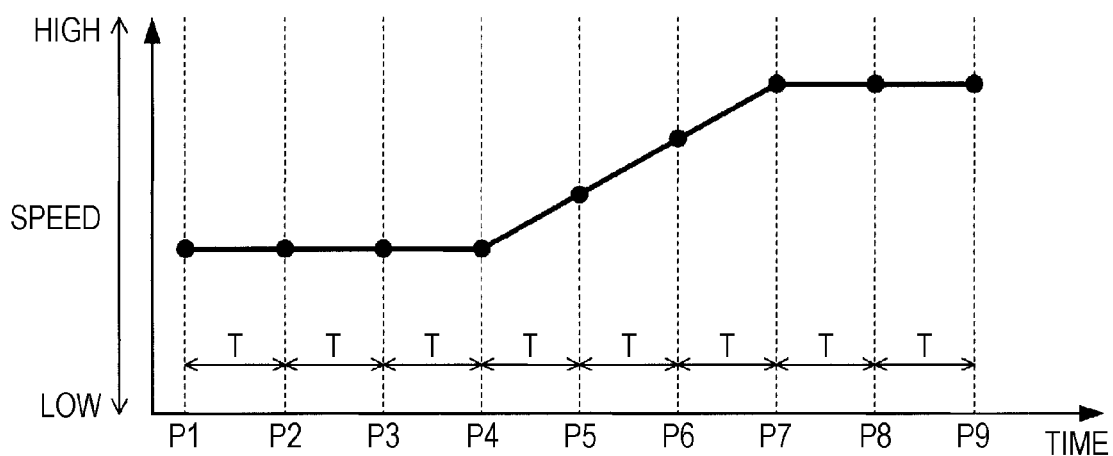
FIGS. 16A and 16B are illustrations of the automatic image-capturing process in the image-capturing apparatus of the related art.
Figure 16B:
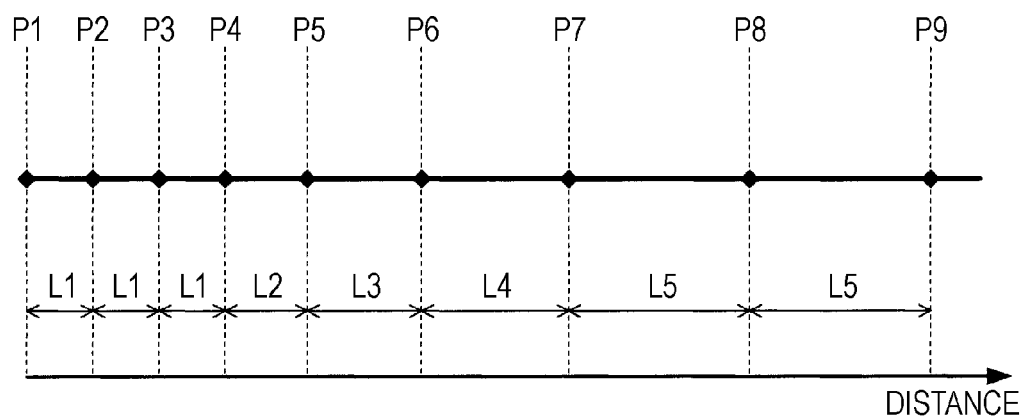

Initially, the system controller 2 performs the processing operations of steps F701 to F706 in FIG. 14, which are the same as the processing operations of steps F201 to F206 in FIG. 5. Then, when it is determined in step F706 that the distance Ln moved after the previous image-capturing operation was performed is greater than or equal to the distance Lx, the system controller 2 causes the process to proceed to step F707.

In step F707, the system controller 2 performs a process for determining whether or not the count value of the timer Tm2 is smaller than or equal to a predetermined time period Tx. The time period Tx is a threshold value for the period from the time when the previous image-capturing operation was performed.

When it is determined that the count value of the timer Tm2 is smaller than or equal to the time period Tx, the system controller 2 causes the process to proceed to step F709.

In step F709, the system controller 2 issues instructions for performing an image-capturing operation in the form of moving images. That is, the system controller 2 instructs the image-capturing unit 3 to capture image data of, for example, 30 frames per second, and causes the image-capturing controller 4 to retrieve the captured image data and compress it in accordance with the MPEG2 method, and to transfer the compressed moving image data to the storage unit 8. Then, the system controller 2 causes the storage unit 8 to record, as moving images, the transferred captured image data on a recording medium.

Furthermore, when it is determined in step F707 that the count value of the timer Tm2 is greater than the time period Tx, the system controller 2 causes the process to proceed to step F708.

In step F708, the system controller 2 issues instructions for performing an image-capturing operation in the form of still images. That is, the system controller 2 instructs the image-capturing unit 3 to capture an image of a subject, and causes the image-capturing controller 4 to retrieve the captured image data of one frame, to perform a process for compressing the captured image data in accordance with the JPEG method, and to transfer it to the storage unit 8. Then, the system controller 2 causes the storage unit 8 to record, as a still image, the transferred captured image data of one frame on a recording medium.

After the process of step F708 or F709, the system controller 2 returns to step F701 and performs processing in a similar manner.

According to such a processing, when the movement is comparatively slow, still images are recorded at intervals of a fixed distance Lx. In the case of high-speed movement in which a fixed distance Lx is reached within the time period Tx, a moving image is recorded.

When the captured image is stored as a moving image, the subject can be viewed as moving more smoothly when it is reproduced later, than when it is stored as a still image and scenery having a sense of realism can be recorded. However, a large amount of the recording capacity is consumed. Therefore, during high-speed movement in which the image-capturing apparatus 1 moves the distance Lx in the time period of the time period Tx or less, moving-image capturing is performed, and when it takes time to move the distance Lx, a switch is made to still images, thereby saving the capacity.

10. Modification

The embodiments of the present invention have thus been described. The present invention should not be limited to any of the above-described embodiments.

Each of the above-described examples has been basically described using an in-vehicle image-capturing apparatus 1 shown in FIG. 1A. The processing of each of the automatic image-capturing processing operation examples I, II, III, IV, V, VI, and VII can be applied the same to the image-capturing apparatus 1 of a type worn by the user as shown in FIGS. 1B and 1C. As a result, a life log camera for appropriately recording the daily life of the user can be implemented.

Furthermore, when scenery of the daily life of the user and scenery during driving are to be recorded as captured image data by being used as a life log camera or a drive log camera, audio may also be recorded simultaneously. In that case, the image-capturing apparatus 1 may be provided with a microphone and an audio processor, so that audio data is recorded together with images.

As a technique in which the amount of captured image data to be recorded in the storage unit 8 is reduced and the recording capacity of the storage unit 8 is saved, a technique of combining the processing examples of the automatic image-capturing processing operation examples V and VI described with reference to FIGS. 10 and 13 is also possible. For example, in the process of step F508 of FIG. 10 described above, a processing operation in which the image size of captured image data is set to an image size sz1 and the compression ratio is set to a compression ratio qt1 is possible. Furthermore, in step F510 of FIG. 10 described above, a processing operation in which captured image data has an image size sz2 and the compression ratio is set to a compression ratio qt2 is possible. In step F512, a processing operation in which captured image data has an image size sz3 and the compression ratio is set to a compression ratio qt3 is possible. In step F513, a processing operation in which captured image data has an image size sz4 and the compression ratio is set to a compression ratio qt4 is possible.

It should be understood by those skilled in the art that various modifications, combinations, sub-combinations and alterations may occur depending on design requirements and other factors insofar as they are within the scope of the appended claims or the equivalents hereof.

What is claimed is:

1. An image-capturing apparatus comprising:
   an image-capturing unit configured to capture image data in an image-capturing operation;
   a speed detection unit configured to detect speed information; and
   a control unit configured to control the image-capturing unit such that, in an automatic image-capturing process, a distance moved by the image-capturing apparatus is computed based, at least in part, on the speed information, and the image-capturing operation is performed in response to obtaining a computation result indicating that the distance moved by the image-capturing apparatus corresponds to a predetermined distance,
   wherein the control unit is configured to set a shortest waiting time period, and the control unit is configured such that if, after an initialization event occurs, the shortest waiting time period has not elapsed when the computation result is obtained, the control unit causes the image-capturing unit to perform the image-capturing operation after the shortest waiting time period elapses.

2. The image-capturing apparatus of claim 1, wherein the initialization event comprises the image-capturing unit performing a previous image-capturing operation.

3. The image-capturing apparatus of claim 2, wherein the image-capturing apparatus is configured to be disposed on a vehicle, an eyeglass unit, and/or a headgear unit.

4. The image-capturing apparatus of claim 2, wherein the image-capturing apparatus is configured to perform a plurality of image-capturing operations at a plurality of locations, wherein successive locations in the plurality of locations are approximately separated by a fixed distance.

5. An image-capturing apparatus comprising:
   an image-capturing unit configured to capture image data in an image-capturing operation;
   a speed detection unit configured to detect speed information; and
   a control unit configured to control the image-capturing unit such that, in an automatic image-capturing process, a distance moved by the image-capturing apparatus is computed based, at least in part, on the speed information, and the image-capturing operation is performed in response to obtaining a computation result indicating that the distance moved by the image-capturing apparatus corresponds to a predetermined distance,
   wherein the control unit is configured to set a longest waiting time period, and the control unit is configured such that if, after an initialization event occurs, passage of the longest waiting time period occurs before the computation result is obtained, the control unit causes the image-capturing unit to perform the image-capturing operation in response to the passage of the longest waiting time period.

6. An image-capturing apparatus comprising:
   an image-capturing unit configured to capture image data in an image-capturing operation;
   a speed detection unit configured to detect speed information; and
   a control unit configured to control the image-capturing unit such that, in an automatic image-capturing process, a distance moved by the image-capturing apparatus is computed based, at least in part, on the speed information, and the image-capturing operation is performed in response to obtaining a computation result indicating that the distance moved by the image-capturing apparatus corresponds to a predetermined distance,
   wherein:
   the control unit is configured to set a shortest waiting time period and a longest waiting time period,
   the control unit is configured such that if, after an initialization event occurs, the shortest waiting time period has not elapsed when the computation result is obtained, the control unit causes the image-capturing unit to perform the image-capturing operation after the shortest waiting time period elapses, and
   the control unit is configured such that if, after the initialization event occurs, passage of the longest waiting time period occurs before the computation result is obtained, the control unit causes the image-capturing unit to perform the image-capturing operation in response to the passage of the longest waiting time period.

7. An image-capturing apparatus comprising:
   an image-capturing unit configured to capture image data in an image-capturing operation;
   a speed detection unit configured to detect speed information; and
   a control unit configured to control the image-capturing unit such that, in an automatic image-capturing process, a distance moved by the image-capturing apparatus is computed based, at least in part, on the speed information, and the image-capturing operation is performed in response to obtaining a computation result indicating that the distance moved by the image-capturing apparatus corresponds to a predetermined distance, wherein the image-capturing apparatus is configured to perform a plurality of image-capturing operations at a plurality of locations, wherein successive locations in the plurality of locations are approximately separated by a fixed distance.

8. The image-capturing apparatus of claim 7, wherein the image-capturing apparatus is configured to be disposed on a vehicle, an eyeglass unit, and/or a headgear unit.

9. The image-capturing apparatus of claim 7, wherein the speed detection unit is disposed in a vehicle and is configured to detect vehicle-speed pulses of the vehicle.

10. An image-capturing apparatus comprising:
an image-capturing unit configured to capture image data in an image-capturing operation;
a speed detection unit configured to detect speed information; and
a control unit configured to control the image-capturing unit such that, in an automatic image-capturing process, a distance moved by the image-capturing apparatus is computed based, at least in part, on the speed information, and the image-capturing operation is performed in response to obtaining a computation result indicating that the distance moved by the image-capturing apparatus corresponds to a predetermined distance, wherein the speed detection unit computes the speed information based, at least in part, on a distance moved by the image-capturing apparatus during a time period, and the distance moved by the image-capturing apparatus during the time period is computed based, at least in part, on positions of the image-capturing apparatus at a beginning and an end of the time period.

11. An image-capturing method for use with an image-capturing apparatus, the image-capturing method comprising:
obtaining speed information;
computing a distance moved by the image-capturing apparatus based, at least in part, on the speed information; and
in an automatic image-capturing operation, capturing image data in response to obtaining a computation result indicating that the distance moved by the image-capturing apparatus corresponds to a predetermined distance,
further comprising performing a plurality of image-capturing operations at a plurality of locations, wherein successive locations in the plurality of locations are approximately separated by a fixed distance.

12. The image-capturing method of claim 11, wherein obtaining the speed information comprises detecting vehicle-speed pulses of a vehicle in which the image-capturing apparatus is disposed.

* * * * *